US008681654B2

(12) United States Patent
Klincewicz et al.

(10) Patent No.: US 8,681,654 B2
(45) Date of Patent: Mar. 25, 2014

(54) METHODS AND APPARATUS TO DESIGN A SURVIVABLE INTERNET PROTOCOL LINK TOPOLOGY

(75) Inventors: John Klincewicz, Wayside, NJ (US); Gagan Choudhury, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1187 days.

(21) Appl. No.: 12/579,167

(22) Filed: Oct. 14, 2009

(65) Prior Publication Data
US 2011/0085445 A1 Apr. 14, 2011

(51) Int. Cl.
*H04L 12/28* (2006.01)

(52) U.S. Cl.
USPC .......................................... 370/254; 370/351

(58) Field of Classification Search
None
See application file for complete search history.

(56) References Cited

U.S. PATENT DOCUMENTS

| | | | |
|---|---|---|---|
| 5,627,889 A | 5/1997 | Eslambolchi | |
| 6,510,141 B1 * | 1/2003 | Ramfelt et al. | 370/254 |
| 6,697,334 B1 * | 2/2004 | Klincewicz et al. | 370/238 |
| 6,885,634 B1 * | 4/2005 | Choudhury et al. | 370/217 |
| 6,909,700 B1 * | 6/2005 | Benmohamed et al. | 370/255 |
| 6,934,259 B2 * | 8/2005 | Klincewicz et al. | 370/238 |
| 7,002,907 B1 * | 2/2006 | Chen et al. | 370/222 |
| 7,023,818 B1 * | 4/2006 | Elliott | 370/328 |
| 7,082,102 B1 * | 7/2006 | Wright | 370/229 |
| 7,145,878 B2 * | 12/2006 | Katz | 370/238 |
| 7,161,910 B2 * | 1/2007 | Maeno | 370/258 |
| 7,246,172 B2 * | 7/2007 | Yoshiba et al. | 709/233 |
| 7,324,453 B2 * | 1/2008 | Wu et al. | 370/238 |
| 7,336,617 B1 * | 2/2008 | Liu | 370/252 |
| 7,649,834 B2 * | 1/2010 | Badat et al. | 370/216 |
| 7,725,035 B2 * | 5/2010 | Tyan et al. | 398/115 |
| 7,903,564 B2 * | 3/2011 | Ramakrishnan et al. | 370/238 |
| 8,094,575 B1 * | 1/2012 | Vadlakonda et al. | 370/252 |
| 8,320,255 B2 * | 11/2012 | Vasseur et al. | 370/238 |
| 8,477,616 B1 * | 7/2013 | Rogers et al. | 370/235 |
| 2002/0071395 A1 * | 6/2002 | Redi et al. | 370/252 |
| 2002/0118647 A1 * | 8/2002 | Maeno | 370/238.1 |

(Continued)

OTHER PUBLICATIONS

Chiu et al., "Network Design and Architectures for Highly Dynamic Next-Generation IP-Over-Optical Long Distance Networks," Journal of Lightwave Technology, vol. 27, Issue 12, Jun. 15, 2009, 14 pages.

(Continued)

*Primary Examiner* — Bunjob Jaroenchonwanit
(74) *Attorney, Agent, or Firm* — Hanley, Flight & Zimmerman, LLC

(57) ABSTRACT

Methods and apparatus to design a survivable Internet Protocol link topology are disclosed. An example method to generate a network topology is described, which includes identifying a plurality of potential express links based on a first subset of a plurality of physical links coupling a plurality of communication network nodes, wherein one or more of the potential express links includes a network layer link traversing more than one of the physical links, determining an amount of network layer traffic that may be carried on a first potential express link, selecting the first potential express link as a chosen express link based on at least one of the traffic or a first number of network layer links on the physical links, adding the chosen express link to a list of express links, generating a plurality of network topologies by selecting one or more different numbers of express links from the list of express links, and selecting one of the generated network layer topologies based on a cost of the generated network layer topologies.

20 Claims, 21 Drawing Sheets

(56) References Cited

U.S. PATENT DOCUMENTS

| | | | | |
|---|---|---|---|---|
| 2003/0214914 | A1* | 11/2003 | Cain | 370/252 |
| 2004/0042402 | A1* | 3/2004 | Galand et al. | 370/237 |
| 2004/0057389 | A1* | 3/2004 | Klotz et al. | 370/252 |
| 2004/0095887 | A1* | 5/2004 | Klincewicz et al. | 370/237 |
| 2005/0152284 | A1* | 7/2005 | Kotha et al. | 370/254 |
| 2005/0169193 | A1* | 8/2005 | Black et al. | 370/254 |
| 2006/0126521 | A1* | 6/2006 | Hyndman et al. | 370/248 |
| 2006/0250964 | A1* | 11/2006 | Vasseur et al. | 370/238 |
| 2007/0070883 | A1 | 3/2007 | Lysne et al. | |
| 2007/0091811 | A1* | 4/2007 | Thubert et al. | 370/238 |
| 2007/0189191 | A1* | 8/2007 | Ades | 370/254 |
| 2009/0116404 | A1* | 5/2009 | Mahop et al. | 370/254 |
| 2010/0014859 | A1* | 1/2010 | D'Alessandro et al. | 398/48 |
| 2010/0077103 | A1* | 3/2010 | Matsumoto | 709/241 |
| 2010/0246393 | A1* | 9/2010 | Chamas et al. | 370/230 |
| 2011/0228705 | A1* | 9/2011 | Aguirre et al. | 370/254 |
| 2011/0292832 | A1* | 12/2011 | Bottari et al. | 370/254 |

OTHER PUBLICATIONS

Klincewicz et al., "Incorporating QoS into IP Enterprise Network Design," Telecommunications Systems, 2002, pp. 81-106, Kluwer Academic Publishers, the Netherlands.
Holmberg et al., "Optimization of Internet Protocol Network Design and Routing," Wiley Periodicals, Inc., vol. 43, No. 1, 2004, pp. 39-53.
Borne et al., "Design of Survivable IP-over-optical networks," Annals of Operations Research, Springer Science and Business Media, LLC, published online Jun. 27, 2006, pp. 41-73.
Buriol et al., "Survivable IP Network Design with OSPF Routing," Wiley Periodicals, Inc., published online Oct. 2, 2006 at www.interscience.wiley.com, vol. 49, pp. 51-64, 2007.
Andrade et al., "Survivable Composite-Link IP Network Design with OSPF Routing," AT&T Labs Research Technical Report, Eighth INFORMS Telecommunications Conference, Dallas, TX, Apr. 2006, 4 pages.
Bley et al., "Design of Broadband Virtual Private Networks: Model and Heuristics for the B-Win," in Robust Communication Networks: Interconnection and Survivability, DIMACS Series in Discrete Mathematics and Theoretical Computer Science, vol. 53, Mar. 30, 1998, 16 pages.
Chiu et al., "Network Design and Architectures for Highly Dynamic Next-Generation IP-over-Optical Long Distance Networks," Presented Mar. 22-29, 2009, Proceedings of the Optical Fiber Communications Conference and Exhibition at the National Fiber Optic Engineers Conference, San Diego, CA, 3 pages.
Klincewicz, "Issues in link topology design for IP networks," SPIE vol. 6011, Oct. 24-25, 2005, 10 pages.
Choudhury, "Models for IP/MPLS Routing Performance: Convergance, Fast Reroute, and QoS Impact," Keynote Address, Proceedings of ITCOM Conference on Performance, QoS and Control of Next-Generation Communication Networks, SPIE vol. 5598, Philadelphia, PA, pp. 1-12, Oct. 26-27, 2004.

* cited by examiner

TOPOLOGY DATABASE

302

| LINK | NODE 1 | NODE 2 | LENGTH (km) |
|---|---|---|---|
| A | N1 | N2 | 861 |
| B | N2 | N3 | 230 |
| C | N1 | N3 | 1090 |
| D | N1 | N5 | 558 |
| E | N5 | N6 | 575 |
| F | N6 | N7 | 1613 |
| G | N3 | N4 | 2757 |
| H | N4 | N7 | 1091 |
| I | N3 | N8 | 2781 |
| J | N8 | N9 | 1073 |
| K | N9 | N10 | 126 |
| L | N7 | N10 | 2290 |
| M | N10 | N11 | 1189 |
| N | N7 | N11 | 1146 |

TRAFFIC MATRIX

DESTINATION NODE

| | N1 | N2 | N3 | N4 | N5 | N6 | N7 | N8 | N9 | N10 | N11 |
|---|---|---|---|---|---|---|---|---|---|---|---|
| N1 | | 8.98 | 12.16 | 4.42 | 17.64 | 11.21 | 15.86 | 10.16 | 24.44 | 8.23 | 8.75 |
| N2 | 17.15 | | 18 | 23.91 | 24.34 | 2.08 | 12.63 | 6.65 | 18.09 | 20.13 | 15.07 |
| N3 | 4.83 | 19.11 | | 5.22 | 19.4 | 12.13 | 16 | 5.19 | 12.8 | 15.64 | 7.56 |
| N4 | 16.37 | 6.28 | 13.23 | | 6.73 | 6.12 | 7.8 | 15.58 | 20.59 | 17.36 | 22.84 |
| N5 | 2.46 | 10.58 | 10.27 | 6.75 | | 6.77 | 4.56 | 16.26 | 7.04 | 23.46 | 4.52 |
| N6 | 14.15 | 16.77 | 9.04 | 24.62 | 16.54 | | 2.66 | 16.38 | 24.7 | 18.83 | 9.34 |
| N7 | 24.85 | 5.56 | 10.32 | 4.08 | 10.93 | 18.65 | | 4.11 | 7.75 | 9.65 | 24.57 |
| N8 | 12.85 | 5.07 | 20.58 | 23.56 | 14.21 | 21.74 | 17.57 | | 23.85 | 5.47 | 2.74 |
| N9 | 18.44 | 18.29 | 14.3 | 14.86 | 19.69 | 5.83 | 24.24 | 3.35 | | 6.85 | 13.83 |
| N10 | 5.15 | 19.07 | 23.92 | 16.57 | 15.78 | 13.5 | 4.97 | 12.57 | 6.37 | | 15.97 |
| N11 | 3.96 | 7.06 | 8.86 | 18.65 | 4.08 | 20.32 | 11.27 | 7.83 | 8.03 | 13.63 | |

SOURCE NODE

FIG. 6

308 → POTENTIAL EXPRESS LINKS

| BB NODE 1 | BB NODE 2 | PHYSICAL LINKS | LENGTH (km) | DIRECT TRAFFIC (Gbps) | | TOTAL POTENTIAL TRAFFIC (Gbps) | |
|---|---|---|---|---|---|---|---|
| | | | | N1 -> N2 | N2 -> N1 | N1 -> N2 | N2 -> N1 |
| ~~N1~~ | ~~N3~~ | ~~C~~ | ~~1090~~ | ~~12.16~~ | ~~4.83~~ | | |
| N1 | N7 | DEF | 2223 | 15.86 | 24.85 | 40.73 | 44.49 |
| ~~N1~~ | ~~N10~~ | ~~DEFL~~ | ~~5036~~ | ~~8.23~~ | ~~5.15~~ | | |
| N3 | N7 | CDEF | 3836 | 16 | 10.32 | 10.32 | 16 |
| N3 | N10 | IJK | 3980 | 15.64 | 23.92 | 35.77 | 42.99 |
| ~~N7~~ | ~~N10~~ | ~~L~~ | ~~2290~~ | ~~9.65~~ | ~~4.97~~ | | |

FIG. 7

310 ⟶   CHOSEN EXPRESS LINKS

| BB NODE 1 | BB NODE 2 | PHYSICAL LINKS | LENGTH | TRAFFIC (Gbps) | POTENTIAL TRAFFIC (Gbps) | |
|---|---|---|---|---|---|---|
| N1 | N7 | DEF | 2223 | 15.86 | 44.49 | 44.49 |

310 —↘

CHOSEN EXPRESS LINKS

| BB NODE 1 | BB NODE 2 | PHYSICAL LINKS | LENGTH | TRAFFIC (Gbps) | POTENTIAL TRAFFIC (Gbps) | |
|---|---|---|---|---|---|---|
| N1 | N7 | DEF | 2223 | 15.86 | 44.49 | 44.49 |
| N3 | N10 | IJK | 3980 | 15.64 | 35.77 | 42.99 |

CHOSEN EXPRESS LINKS

| BB NODE 1 | BB NODE 2 | PHYSICAL LINKS | LENGTH | TRAFFIC (Gbps) | POTENTIAL TRAFFIC (Gbps) | |
|---|---|---|---|---|---|---|
| N1 | N7 | DEF | 2223 | 15.86 | 44.49 | 44.49 |
| N3 | N10 | IJK | 3980 | 15.64 | 35.77 | 42.99 |
| N3 | N7 | CDEF | 3836 | 16 | 16 | 16 |

1700 → IP LINKS

| IP LINK | LENGTH (km) | WEIGHT | $T_i$ (Gbps) | $c_i$ (Gbps) | UTILIZATION |
|---|---|---|---|---|---|
| A | 861 | 3.24 | 0 | 40 | 0 |
| B | 230 | 1.60 | 0 | 40 | 0 |
| C | 1090 | 3.83 | 0 | 40 | 0 |
| D | 558 | 2.45 | 0 | 40 | 0 |
| E | 575 | 2.49 | 0 | 40 | 0 |
| F | 1613 | 5.19 | 0 | 40 | 0 |
| G | 2757 | 8.16 | 0 | 40 | 0 |
| H | 1091 | 3.83 | 0 | 40 | 0 |
| I | 2781 | 8.22 | 0 | 40 | 0 |
| J | 1073 | 3.79 | 0 | 40 | 0 |
| K | 126 | 1.33 | 0 | 40 | 0 |
| L | 2290 | 6.95 | 0 | 40 | 0 |
| M | 1189 | 4.09 | 0 | 40 | 0 |
| N | 1146 | 3.98 | 0 | 40 | 0 |
| EXPRESS1 | 2223 | 6.77 | 0 | 40 | 0 |
| EXPRESS2 | 3980 | 11.34 | 0 | 40 | 0 |
| EXPRESS3 | 3836 | 10.96 | 0 | 40 | 0 |

1700 ⟶                    IP LINKS

| IP LINK | LENGTH (km) | WEIGHT | $T_i$ (Gbps) | $c_i$ (Gbps) | $T_i$ + 23.91 (Gbps) | NEW UTILIZATION | WEIGHT + PENALTY |
|---|---|---|---|---|---|---|---|
| A | 861 | 3.24 | 50.24 | 80 | 74.15 | 0.926875 | 3.24 |
| B | 230 | 1.60 | 20.84 | 40 | 44.75 | 1.11875 | 2.60 |
| C | 1090 | 3.83 | 15.72 | 40 | 39.63 | 0.99075 | 9.83 |
| D | 558 | 2.45 | 6.95 | 40 | 30.86 | 0.7715 | 2.45 |
| E | 575 | 2.49 | 23.98 | 40 | 47.89 | 1.19725 | 5.49 |
| F | 1613 | 5.19 | 26.88 | 40 | 50.79 | 1.26975 | 12.19 |
| G | 2757 | 8.16 | 9.18 | 40 | 33.09 | 0.82725 | 8.16 |
| H | 1091 | 3.83 | 12.36 | 40 | 36.27 | 0.90675 | 3.83 |
| I | 2781 | 8.22 | 14.14 | 40 | 38.05 | 0.95125 | 23.22 |
| J | 1073 | 3.79 | 32.17 | 40 | 56.08 | 1.402 | 10.79 |
| K | 126 | 1.33 | 27.5 | 40 | 51.41 | 1.28525 | 2.33 |
| L | 2290 | 6.95 | 21.49 | 40 | 45.4 | 1.135 | 10.95 |
| M | 1189 | 4.09 | 25.55 | 40 | 49.46 | 1.2365 | 8.09 |
| N | 1146 | 3.98 | 19.84 | 40 | 43.75 | 1.09375 | 9.98 |
| EXPRESS1 | 2223 | 6.77 | 67.98 | 80 | 91.89 | 1.148625 | 16.77 |
| EXPRESS2 | 3980 | 11.34 | 42.31 | 80 | 66.22 | 0.82775 | 11.34 |
| EXPRESS3 | 3836 | 10.96 | 30.13 | 40 | 54.04 | 1.351 | 18.96 |

| TABLE 1<br>IP Network Design | Capacity in units of 1000 Wavelength-km. | Number of 40 Gbps IP Links | Normalized Total Cost |
|---|---|---|---|
| Case 1 (138 Direct Links + 0 Express Links) | 1076.6 | 2759 | 116.5 |
| Case 2 (138 Direct Links + 43 Express Links) | 1110.3 | 1895 | 100.3 |
| Case 3 (138 Direct Links + 68 Express Links) | 1157.7 | 1760 | 100 |
| Case 4 (138 Direct Links + 98 Express Links | 1212.6 | 1713 | 102.0 |

FIG. 28

| TABLE 2<br>Restoration scenarios | Capacity in units of 1000 Wavelength-km. | Number of 40 Gbps IP Links | Normalized Total Cost | Spare Capacity Ratio |
|---|---|---|---|---|
| No Failure Restoration | 940.4 | 1344 | 79.4 | 0 |
| Single Failure Restoration | 1157.7 | 1760 | 100 | 0.231 |
| Single + Double Failure Restoration | 1206.5 | 1770 | 102.9 | 0.283 |
| Single + Double + Triple Failure Restoration | 1209.6 | 1772 | 103.1 | 0.286 |

FIG. 29

| TABLE 3 Routing Protocols | Capacity in units of 1000 Wavelength-km. | Number of 40 Gbps IP Links | Normalized Total Cost | Spare Capacity Ratio |
|---|---|---|---|---|
| Optimized MPLS-TE | 1157.7 | 1760 | 100 | 0.231 |
| OSPF | 1583.3 | 2355 | 135.7 | 0.684 |

FIG. 30

| Type of Routing | Capacity Needs for | | |
|---|---|---|---|
| | Inter-Office Links (OC-192 Equiv.) | Intra-Office Links (10 GE Equiv.) | Inter-Office Equiv. OC-192 Link-Miles |
| OSPF Shortest Path (PMO) | 426 | 154 | 314.2K |
| MPLS-TE Routing | 319 (-25.1%) | 126 (-18.2%) | 232.6K (-26%) |

FIG. 31

METHODS AND APPARATUS TO DESIGN A SURVIVABLE INTERNET PROTOCOL LINK TOPOLOGY

FIELD OF THE DISCLOSURE

This disclosure is generally related to designing Internet protocol (IP) link topology over physical links and, more particularly, to methods and apparatus to design a survivable IP link topology.

BACKGROUND

The Open System Interconnection (OSI) reference model uses seven different layers to define system interconnections. The first layer of the OSI model is the physical layer, which defines the basic hardware functions through which two systems can physically communicate raw bits of information. The physical layer includes hardware to transmit electromagnetic signals including, for example, electrical, wireless, and optical signals.

The third layer of the OSI model is the network layer, which is responsible for connection functions, addressing, and routing of information from a source to a destination. The third layer of the OSI model operates using the physical interconnections defined at the physical layer. In a system where the network layer is an Internet Protocol (IP) network layer, a network is defined by a plurality of interconnected nodes or routers that each have an IP address. Packets of data are then transmitted over router-to-router links between different source-destination pairs. Not every pair of nodes or routers is directly connected and some source-destination pairs must send packets over a series of direct node-to-node or router-router connections to exchange traffic.

In an IP-over-wavelength division multiplexing (WDM) architecture, the communication links or IP links (network layer) between router pairs are established using wavelengths carried over optical fibers (physical layer). Using WDM, each optical fiber in the optical network can carry multiple wavelengths and, thus, multiple IP links. In particular, a given physical link in the optical network may carry wavelengths that connect multiple different router pairs.

BRIEF DESCRIPTION OF THE DRAWINGS

FIG. 5 illustrates an example topology database representative of the example optical network of FIG. 4.

FIG. 6 illustrates an example traffic database representative of example communication traffic handled by the example optical network of FIG. 4.

FIG. 7 illustrates an example potential express links database representative of the example optical network of FIG. 4.

FIG. 19 is the table of FIG. 17 after several traffic elements from a traffic database have been added to the IP links in a selected network scenario.

FIG. 20 illustrates the IP links of FIG. 19 associated with the example optical network of FIG. 4 and the corresponding weights, including applied penalties.

FIG. 28 is a table illustrating results of an example computational comparison of four different IP link topologies.

FIG. 29 is a table illustrating results of an example computational comparison of four different failure restoration scenarios.

FIG. 30 is a table illustrating results of an example computational comparison of two different failure routing methods.

FIG. 31 is a table illustrating results of an example computational comparison of two different capacity planning methods.

DETAILED DESCRIPTION

Certain examples are shown in the above-identified figures and described in detail below. In describing these examples, like or identical reference numbers may be used to identify similar elements. The figures are not necessarily to scale and certain features and certain views of the figures may be shown exaggerated in scale or in schematic for clarity and/or conciseness. Although the following discloses example methods, apparatus, and articles of manufacture, it should be noted that such methods, apparatus, and articles of manufacture are merely illustrative and should not be considered as limiting. Accordingly, while the following describes example methods, apparatus, and articles of manufacture, the examples are not the only way to implement such methods, apparatus, and articles of manufacture.

The example methods and apparatus described herein are useful for designing Internet Protocol (IP)-over-Wavelength Division Multiplexing (WDM) optical networks having high survivability and low cost. Some example networks described herein are designed for survivability in the event of an optical network failure (i.e., the loss of any given physical link or optical switch). Under normal conditions, traffic between a specified pair of routers (e.g., source-destination pair) utilizes a specific path or sequence of physical links to implement an IP link within the optical network. In some examples, the optical network is designed such that the capacity of each IP link is sufficient to carry the traffic that would utilize the link under normal conditions. Additionally, the example optical networks are designed so that, in the event of a failure somewhere in the optical network, some IP links may carry additional traffic that would ordinarily use the links that are affected by the failure. In some example optical networks, the capacity of each IP link is also sufficient to carry the additional traffic that utilizes that IP link in response to different optical network failures.

If an inordinate number of IP links all utilize a particular physical link, the failure of that particular physical link would have significant impact elsewhere in the optical network, because other IP links then have to carry a significant amount of additional traffic in order to ensure the survivability of the network.

The example methods and apparatus described below are useful in designing an IP link topology in an IP-over-WDM architecture that considers the set of IP links that would be carried over each physical link. In choosing which IP links to establish, the example methods and apparatus consider the different possible failures that could result and the effects that any of the failures would have on required traffic capacities. The example methods and apparatus are particularly useful in designing large, sparse optical networks, but may be used to design other networks without departing from the scope of the disclosure.

Figure 1:
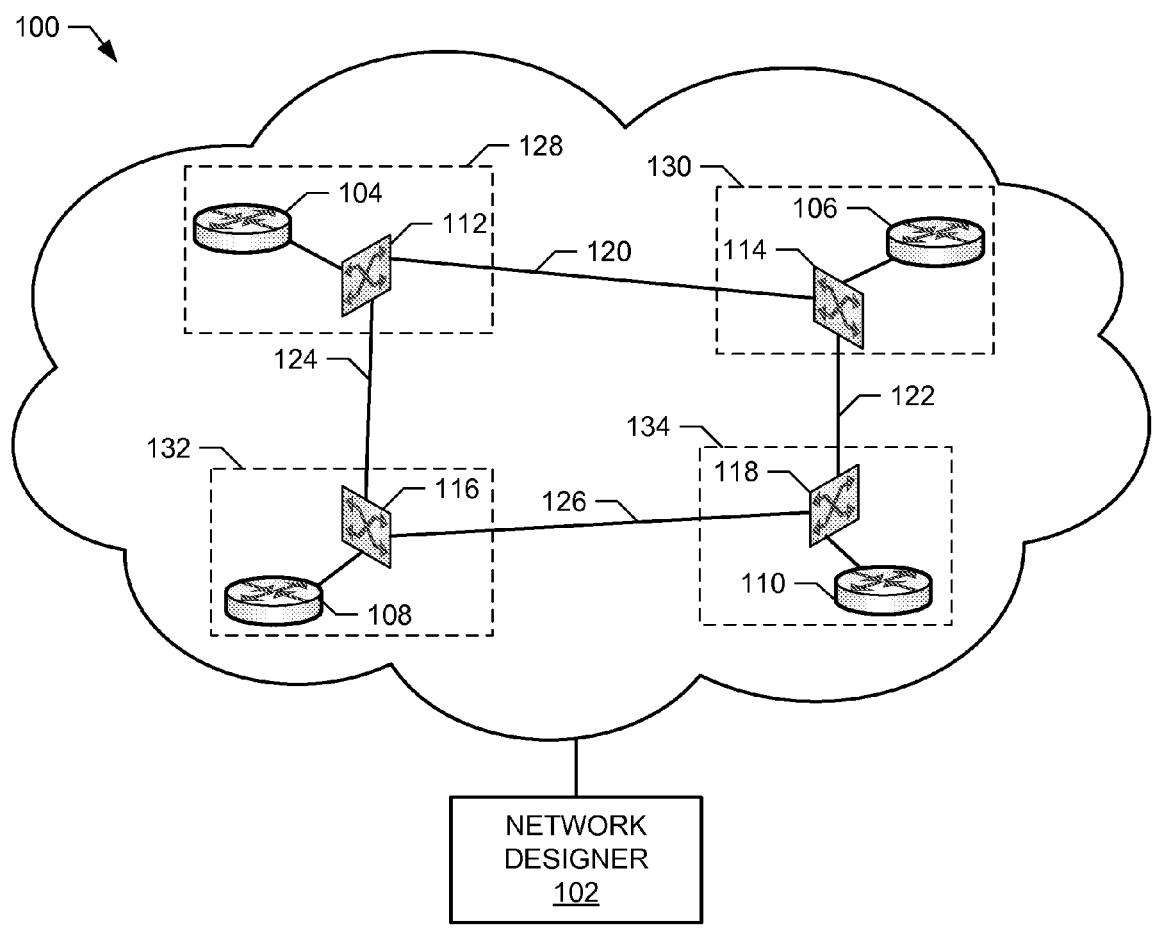
FIG. 1 illustrates an example communications network and an example network designer.

FIG. 1 illustrates an example communications network 100 and an example network designer 102. The communications network 100 may represent, for example, a simple IP-over-WDM network. The network 100 includes four routers 104, 106, 108, and 110. Each of the routers 104-110 is connected to a respective optical switch 112, 114, 116, and 118. The optical switches 112-118 are interconnected via physical links 120, 122, 124, and 126, each link representing one or more optical fibers. Each optical fiber on a link can carry one or more wavelengths between a pair of optical switches 112-118. Together, a router and an optical switch may be represented by a node, as shown at reference numerals 128, 130, 132, and 134.

In an optical network, a wavelength represents a frequency of laser light that can be used to transmit a digital signal, such as an OC48, OC192 or OC768. A single digital connection between a pair of routers corresponds to a pair of wavelengths that carry traffic in opposite directions. A single digital connection will be referred to herein as a circuit. A set of wavelengths between the same pair of routers constitutes an IP-layer link, or, simply, an IP link. An individual IP link may consist of one or more circuits between the same pair of routers 104-110. The number of circuits on an IP link determines the capacity (e.g., in megabits per second (Mbps), gigabits per second (Gbps), or terabits per second (Tbps)) of the link. The capacity that is required on an IP link is determined not only by the amount of traffic that needs to be carried under normal conditions, but by the amount of traffic that would have to use that IP link because of a failure elsewhere in the network 100.

Each physical link can carry multiple IP links, e.g. link 120 can carry both circuits between the routers 104 and 106 and circuits between the routers 104 and 110. Each physical link 120-126 has a length, which is used in the described examples to calculate the shortest physical paths over an optical network.

A set of physical links that all carry the same set of circuits is often referred to as a Shared Risk Link Group (SRLG). A failure anywhere in the SRLG will cause the same set of router-to-router connections to be lost. An SRLG may include a single physical link or multiple physical links.

The circuits between pairs of routers 104-110 utilize the physical links 120-126. For example, the router 104 and the router 106 are connected by signals that are carried over the physical link 120. The IP links can also utilize multiple physical links 120-126. For example, the router 104 and the router 110 can be connected by signals that are carried via the physical link 120 and the physical link 122, and/or via the physical link 124 and the physical link 126. Similarly, the routers 106 and 108 can be connected by signals carried on the physical links 120 and 124 and/or the physical links 122 and 126. IP links that utilize multiple physical links are referred to herein as express links.

Figure 2:
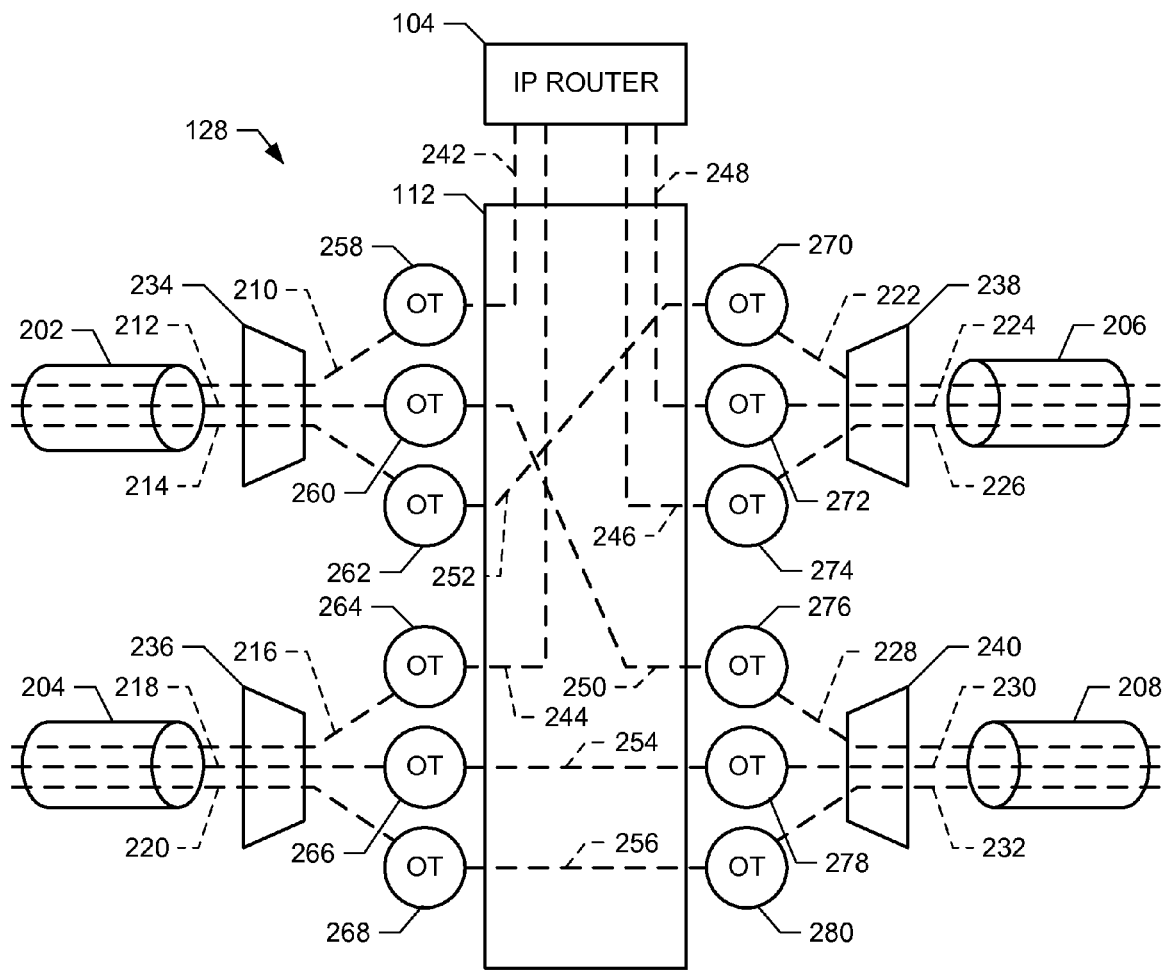
FIG. 2 is a more detailed block diagram of an example node illustrated in FIG. 1.

FIG. 2 is a more detailed block diagram of an example node illustrated in FIG. 1. For clarity and brevity, the following discussion will refer to the example node 128, which includes the example router 104 and the example optical switch 112 of FIG. 1. The example node 128 connects to other nodes (e.g., the nodes 130 and 132 of FIG. 1) via optical fibers 202, 204, 206, and 208. Each example fiber carries multiple wavelengths 210-232, which are represented by dashed lines. Wavelengths 210-232 carried on the same fibers 202-208 (e.g., 210 and 212) have different optical wavelengths, but wavelengths 210-232 carried on different fibers 202-208 (e.g., 210 and 216) may have similar or identical optical wavelengths. Within the optical fibers 202-208 the different wavelengths are combined into an optical signal.

Dense wavelength division multiplexers (DWDM) 234, 236, 238, and 240 separate the optical signals carried by the fibers 202-208 into the individual wavelengths 210-232, which are then converted into common frequencies 242-256 by optical transponders (OTs) 258-280. The common frequencies can then be cross-connected by the optical switch 112. That is, different "incoming" wavelengths (e.g., 210-214 and 222-226) can either be routed onto "outgoing" wavelengths (e.g., 216-220 and 228-232) or terminated on the IP router 104. In order to be transmitted on an outgoing wavelength, the common frequencies once again pass through OTs 258-280 and DWDMs 234-240.

Figure 3:
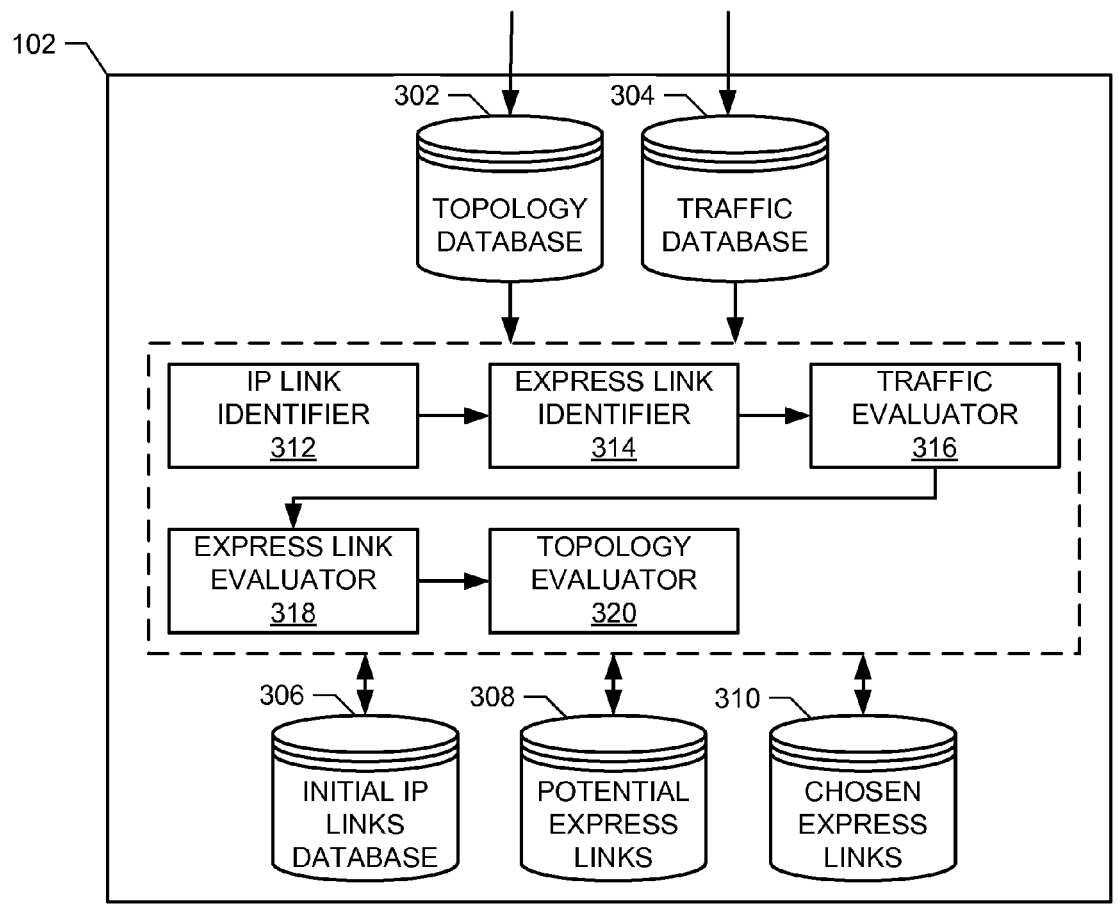
FIG. 3 is a more detailed block diagram of the example network designer illustrated in FIG. 1.

FIG. 3 is a more detailed block diagram of the example network designer 102 illustrated in FIG. 1. The network designer 102 may be used to design a survivable IP link topology. The example network designer 102 will be described with reference to FIG. 4, which illustrates a schematic view of an example optical network 400 including example nodes N1-N11 connected via physical links A-N. Given the optical network 400 illustrated in FIG. 4, the network designer 102 may generate an IP link topology to improve survivability of the optical network 400.

The example network designer 102 of FIG. 3 includes a topology database 302, a traffic database 304, an initial IP links database 306, a potential express link database 308, and a chosen express link database 310. To design an IP link topology based on the databases 302-310, the example network designer 102 further includes an IP link identifier 312, an express link identifier 314, a traffic evaluator 316, an express link evaluator 318, and a topology evaluator 320.

The topology database 302 is populated with pairs of nodes (e.g., N1 and N2, N1 and N5, etc.) that are each connected via a single physical link (e.g., A, D, etc.). The topology database 302 may be populated via user input of the physical topology of the optical network 400. Alternatively, the data may be gathered from other databases in which topology information is stored. In addition to identifying the nodes of a node pair, the topology database 302 further includes the length of the node pair. An example topology database 302 representative of the example optical network 400 is illustrated in FIG. 5. In some examples, the topology database 302 includes distances and the shortest physical path between each set of nodes N1-N11.

The traffic database 304 is a matrix of node-to-node traffic that the network 400 is required to serve (e.g., traffic demands). Like the topology database 302, the traffic database 304 is populated by user input. However, the data may additionally or alternatively be gathered from other databases in which traffic information is stored. IP traffic occurs in two directions (e.g., from N1 to N2 and from N2 to N1), and spans multiple nodes N1-N11 for traffic between nodes N1-N11, including those nodes N1-N11 that are not necessarily directly connected via a physical link A-N. An example traffic database 304, as illustrated in FIG. 6, is organized by the source node, the destination node, and the amount of traffic is in gigabits per second.

The initial IP links database 306 includes a set of IP links that are established based on the physical links A-N. Each single physical link corresponds to an IP link in the initial IP links database 306. The example initial IP links database 306 may be populated by the IP link identifier 312 based on the topology database 302. Populating the IP links database based on the physical links A-N is advantageous in that it is relatively simple and ensures that the resulting initial IP link topology is two-connected (i.e., connected to more than one other nodes for redundancy) if the underlying physical topology is two-connected. However, other methods to determine an initial IP link topology may be used, in which case additional steps may be required to ensure that the final IP link topology described below is two-connected.

The potential express links database 308 is a list of possible express links as determined by the network designer 102. In some examples, the potential express nodes are selected to be pairs of backbone nodes that exchange traffic in excess of a predetermined lower limit. The example network designer 102 of FIG. 3 defines a backbone node to be a node N1-N11 that is directly coupled via an optical link to more than two other nodes N1-N11. Thus, in the example optical network 400 of FIG. 4, the nodes N1, N3, N7, and N10 are backbone nodes. The potential express links database 308 includes the endpoint nodes of each potential express link and the additional nodes through which the potential express link passes in accordance with the shortest length-wise path between the endpoint nodes.

FIG. 7 illustrates an example potential express links database 308. The potential express links database 308 includes the backbone nodes that are the endpoint nodes of the potential express links, the physical links over which the potential express link is routed on its shortest physical path, the length of the shortest physical path, the direct traffic between the end point nodes, and the total potential traffic on the potential express link. The potential traffic column is determined by the traffic evaluator 316 as described in more detail below.

While the example potential links database 308 of FIG. 7 shows all potential express links, the database 308 may be pruned to remove potential express links that do not exchange a desired amount of traffic in at least one direction (e.g., a 10 Gbps lower bound of traffic would remove the N10 to N1 and N10 to N7 links). Additionally, the potential express link N1 to N3 is directly connected via a single physical link and therefore cannot be an express link. The potential express links that may be removed from the potential express links database 308 due to insufficient traffic and/or direct connection(s) are struck through in FIG. 7.

The example chosen express links database 310 is an ordered list of express links that have been evaluated to determine the potential traffic on the express link and the maximum number of IP links routed on a physical link if the express link is chosen. Potential express links may be chosen from the potential express link database 308 based on reducing or minimizing the maximum number of IP links on a given physical link. Ties between potential express links may be broken by choosing potential express links that have higher potential traffic. The example chosen express links database 310 is initially empty and is populated by the network designer 102.

The IP link identifier 312 identifies an initial set of IP links based on the topology database 302 and populates the initial IP links database 306. Specifically, the example IP link identifier 312 establishes an IP link for each of the physical links specified in the topology database 302 and adds the IP link to the initial IP links database 306.

The express link identifier 314 identifies a set of potential express links based on the topology database 302 and populates the potential express links database 308. In the example of FIG. 5, the express link identifier 314 identifies the backbone nodes (e.g., N1, N3, N7, and N10) and generates potential express links between the backbone nodes N1, N3, N7, and N10. The express link identifier 314 then determines the shortest physical paths to route each express link, and notes the nodes N1-N11 and/or physical links A-N along the shortest physical path for each potential express link. The example express link identifier 314 then prunes the potential express links having less than a predetermined level of traffic (e.g., 10.0 Gbps) and populates the potential express link database 308 with the remaining potential express links.

The traffic evaluator 316 determines the potential traffic on the potential express links in the potential express link database 308. After the express link identifier 314 populates the potential express link database 308, the traffic evaluator 316 evaluates each element of the traffic database 304 and populates the potential express link database 308 with potential traffic data. Initially, the potential traffic for each potential express link is set to zero (i.e., 0 Gbps) in each direction.

The traffic evaluator 316 selects a first element (e.g., source node N1 and destination node N2) from the traffic database 304 having b Gbps of traffic (e.g., 8.98 Gbps) from node N1 to node N2. The traffic evaluator 316 determines the shortest physical path between the selected nodes N1 and N2, which is the path A, and identifies all the nodes encountered along that path. In the example of nodes N1 to N2, there are no additional nodes encountered along the path. The traffic evaluator 316 then determines whether any of the potential express links in the potential express link database 308 has both endpoint nodes along the path between the selected nodes N1 and N2. In the example case, none of the potential express links has both endpoint nodes along the path. For any potential express links that have both endpoint nodes along the path, the traffic evaluator 316 adds b Gbps of traffic (e.g., 8.98 Gbps) to the potential traffic for those potential express links.

The traffic evaluator 316 repeats the evaluation for each element in the traffic database 304. For example, when the traffic evaluator 316 evaluates the element having a source node N11, a destination node N2, and a traffic of 7.06 Gbps, the traffic evaluator determines that the shortest physical path includes the paths A, D, E, F, and N, and is routed through the nodes N1, N2, N5, N6, N7, and N11. The traffic evaluator 316 further determines that the potential express link N7 to N1, which has not been pruned out of the potential express links database 308 based on traffic, has both endpoint nodes along the path. Thus, the traffic evaluator 316 adds 7.06 Gbps to the potential traffic of the potential express link N7 to N1. Similarly, when the traffic evaluator 316 evaluates the element having a source node N2, a destination node N11, and a traffic of 15.07 Gbps, the traffic evaluator 316 adds 15.07 Gbps to the potential express link N1 to N7. After evaluating the elements in the traffic database 304, the traffic evaluator 316 populates the potential express links database 308 with the larger potential traffic of the two directions. The example results generated by the traffic evaluator 316 are illustrated in FIG. 7.

The express link evaluator 318 selects express links from the potential express links database 308 to be added to the chosen express links database 310 in the order of desirability. To choose an express link, the express link evaluator 318 considers the initial IP links database 306 and the chosen express links database 310 and determines the number of IP links routed over each of the physical links A-N. Initially, the chosen express links database 310 is empty and the initial IP links database 306 includes one IP link for each physical link A-N. Thus, the express link evaluator 318 determines the number of IP links on each physical link A-N, which is illustrated in FIG. 8 using the example network 400 of FIG. 4.

For each potential express link that is not already in the chosen express link database 310, the express link evaluator 318 determines the traffic on the potential express link and an upper number of IP links that would be routed on each physical link A-N if the potential express link is added to the chosen express link database 310. The express link evaluator 318 chooses a potential express link that minimizes the upper number of IP links that are routed on any given physical link A-N. If two or more potential express links are tied for the upper number of IP links, the express link evaluator 318 may select between them by choosing the potential express link with the highest potential traffic determined from the potential express links database 308. After choosing one of the potential express links, the example express link evaluator 318 adds the chosen potential express link to the bottom of the chosen express links database 310.

Figures 8, 9:
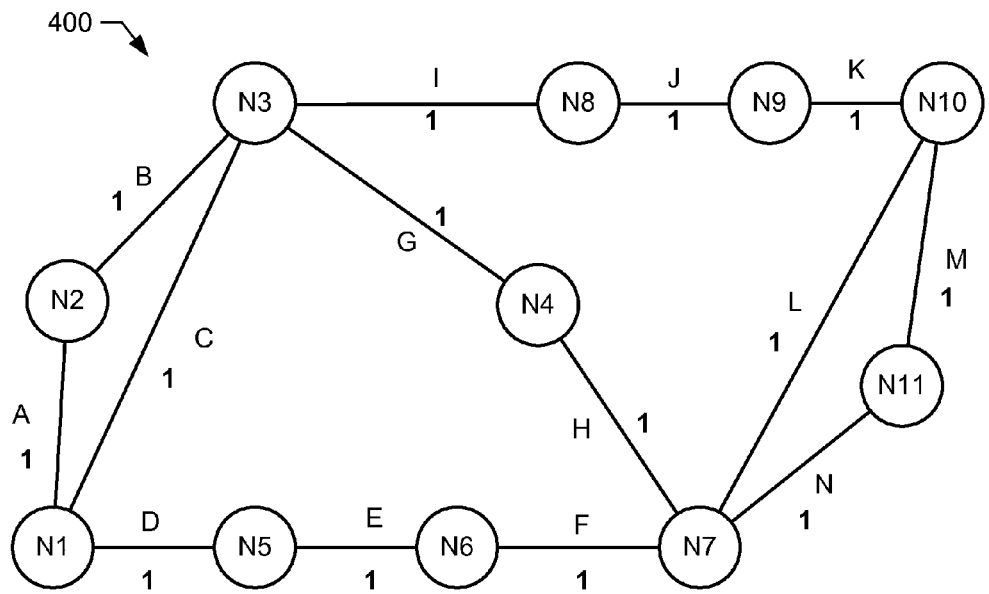
FIG. 8 illustrates the example optical network of FIG. 4, wherein the chosen IP links database is empty, including the numbers of IP links in accordance with an initial IP links database and a chosen express links database.
FIG. 9 illustrates an example chosen express links database including a first chosen express link.

For example, the express link evaluator 318 may first evaluate the number of IP links in the network 400 of FIG. 8. The express link evaluator 318 then evaluates each of the potential express links in the potential express links database 306. The potential express link between the nodes N1 and N7 would introduce one IP link each to the physical links D, E, and F and increase the upper number of IP links on any given physical link to two. The potential express link between the nodes N3 and N7 would introduce one IP link each to the physical links C, D, E, and F and also increase the upper number of IP links on any given physical link to two. The potential express link between the nodes N3 and N10 would introduce one IP link each to the physical links I, J, and K and increase the upper number of IP links on any given physical link to two. Thus, the potential express links between the nodes N1 and N7 and between the nodes N3 and N10 are tied for the upper number of IP links on a given physical link and increasing the upper number of IP links on the lowest number of physical links. The express link evaluator 318 then determines that the potential express link between the nodes N1 and N7 has a higher potential traffic. Accordingly, the express link evaluator 318 adds the potential express link between the nodes N1 and N7 to the bottom of the chosen express links database 310, as illustrated in FIG. 9. However, because the chosen express links database 310 was previously empty, the added potential express link becomes the only potential express link in the chosen express links database 310.

Figure 4:
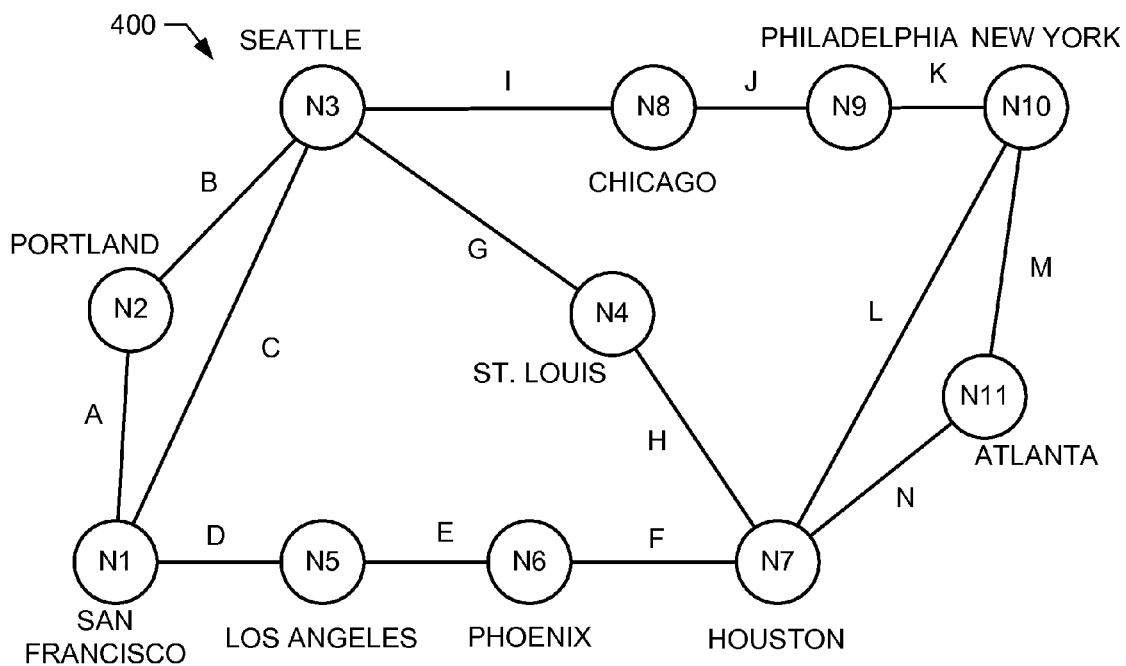
FIG. 4 illustrates a schematic view of an example optical network including example nodes connected via physical links.
Figures 10, 11:
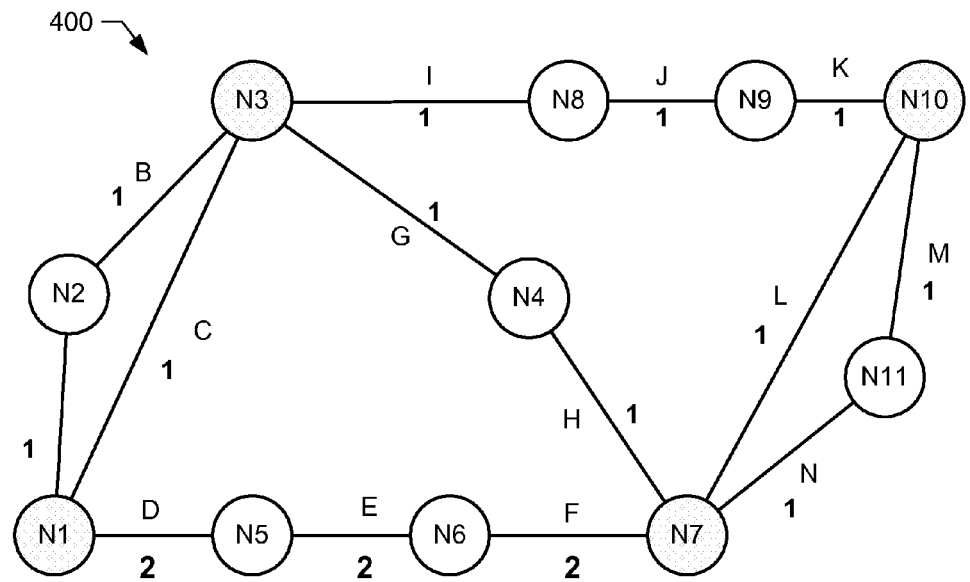
FIG. 10 illustrates the example optical network of FIG. 4, wherein the chosen IP links database includes the first chosen express link, including the numbers of IP links in accordance with an initial IP links database and the chosen express links database of FIG. 9.
FIG. 11 illustrates the example chosen express links database of FIG. 9 further including a second chosen express link.

The express link evaluator 318 again evaluates the number of IP links based on the initial IP links database 306 and the chosen express links database 310. An example of the network 400 of FIG. 4 is shown in FIG. 10 in accordance with the initial IP links database 306 and the chosen express links database 310 populated with the chosen express link between nodes N1 and N7. The express link evaluator 318 then evaluates each of the potential express links in the potential express links database 306. The potential express link between the nodes N3 and N7 would introduce one IP link each to the physical links C, D, E, and F and increase the upper number of IP links on any given physical link to three. The potential express link between the nodes N3 and N10 would introduce one IP link each to the physical links I, J, and K and would not increase the upper number of IP links on any given physical link. Thus, the express links evaluator 318 adds the potential express link between the nodes N3 and N10 to the bottom of the chosen express links database 310 because the added link minimizes the upper number of IP links on a given physical link relative to the potential express link between the nodes N3 and N7. FIG. 11 illustrates the example chosen express links database 310 after the express links evaluator 318 adds the potential express link to the database 310.

Figures 12, 13:
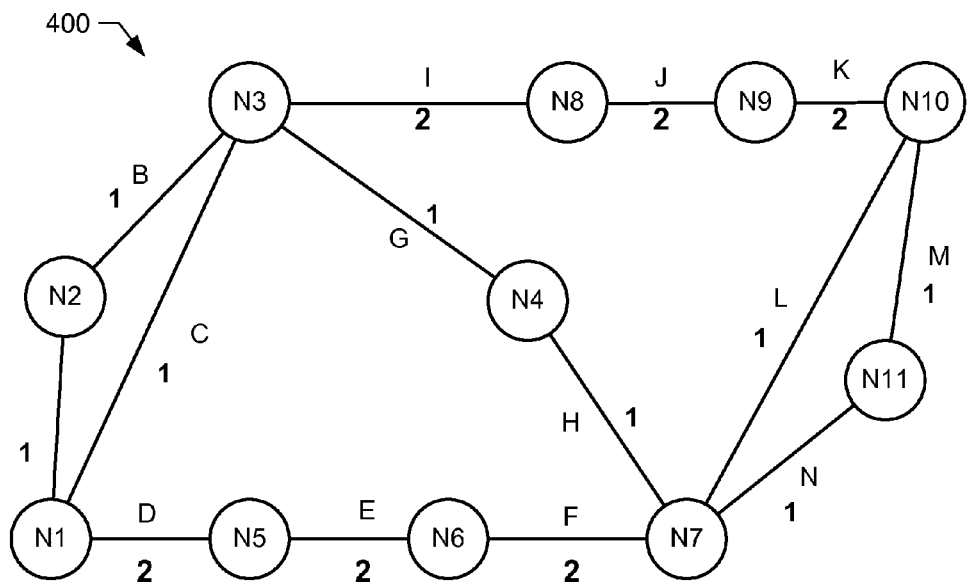
FIG. 12 illustrates the example optical network of FIG. 4, including the numbers of IP links in accordance with an initial IP links database and the chosen express links database of FIG. 11.
FIG. 13 illustrates the example chosen express links database of FIG. 11 further including a third chosen express link.
Figure 14:
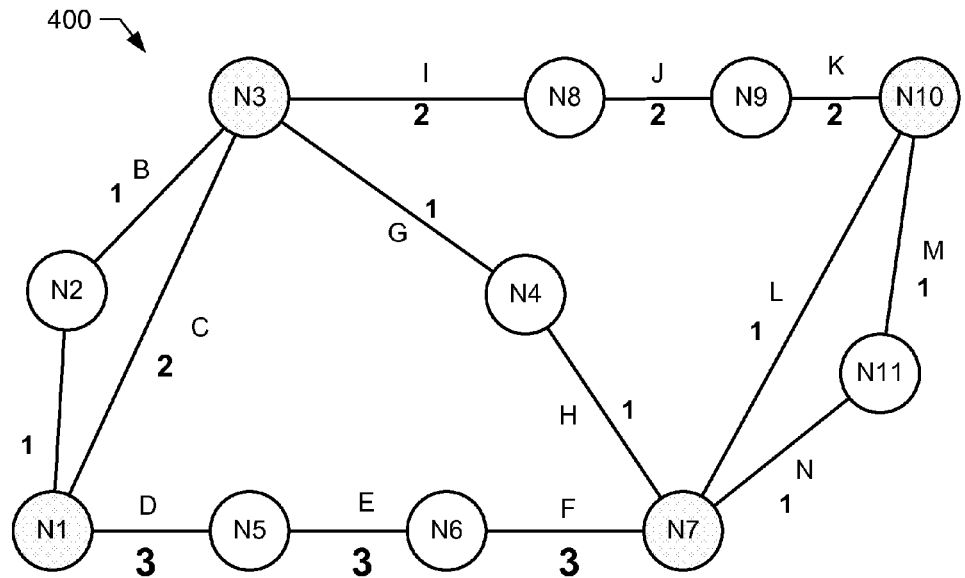
FIG. 14 illustrates the example optical network of FIG. 4, including the numbers of IP links in accordance with an initial IP links database and the chosen express links database of FIG. 13.

The express link evaluator 318 again evaluates the number of IP links based on the initial IP links database 306 and the chosen express links database 310. An example of the network 400 of FIG. 4 is shown in FIG. 12 in accordance with the initial IP links database 306 and the populated chosen express links database 310. As illustrated in FIG. 13, the express link evaluator 318 adds the final potential express link between the nodes N3 and N7 to the bottom of the chosen express links database 310 because it is the only remaining potential express link. FIG. 14 illustrates an example of the network 400 of FIG. 4 in accordance with the initial IP links database and the final chosen express links database 310 after adding all potential express links from the potential express links database 308. In some other examples, the express link evaluator 318 may finish prior to adding all potential express links from the potential express links database 308 to the chosen express links database 310.

After populating the chosen express links database 310, the topology evaluator 320 generates and evaluates different IP link topologies. To generate the different IP link topologies, the topology evaluator 320 selects different values of m, where 0≤m≤M, and M is the number of potential express links in the chosen express links database 310. Each IP link topology evaluated by the topology evaluator 320 includes the IP links in the initial IP link database 306 and the first m express links in the chosen express links database 310. For example, the topology evaluator 320 evaluates a first topology that includes the IP links corresponding to the physical links A-N and the express link between the nodes N1 and N7, and a second topology that further includes the express link between the nodes N3 and N10.

For each of the IP link topologies, the example topology evaluator 320 simulates the routing of traffic in the traffic database 304 under normal conditions (i.e., no network failures) and under different possible failure conditions. As a result, the topology evaluator 320 determines the upper amount of traffic that each IP link would be required to carry. For example, if the physical link E fails, the remainder of the physical links A-D and F-N must carry additional IP links and additional traffic, which requires a certain amount of additional capacity on each of the other physical links A-D and F-N. The topology evaluator 320 determines the amount of capacity on each physical link A-N that is necessary to accommodate all failure conditions.

Additional capacity over a physical link has an associated cost. The cost is typically related to fiber length and terminating equipment. The costs related to fiber length include any capital or operational costs that are proportional to distance. For example, the longer a physical link is, the more fiber will be required to add a given amount of capacity. Costs related to terminating equipment include all costs that are independent of the distance between the endpoint nodes, such as the ports on the router. After the topology evaluator 320 determines the required capacity for each of the different topologies, the topology evaluator 320 determines the cost associated with each topology.

After determining the cost associated with the evaluated topologies, the topology evaluator 320 selects a topology as described in more detail below. The topology evaluator 320 then outputs the selected topology to, for example, a network design user (e.g., via the output device(s) 3214 of FIG. 32 below), to a storage device and/or machine accessible storage medium (e.g., the random access memory 3204, the read only memory 3206, the mass storage device 3218 of FIG. 32 below), and/or to another network location (e.g., via the network 3216 of FIG. 32 below).

When evaluating IP link topologies for cost solutions, the example topology evaluator 320 of FIG. 3 assumes a routing protocol, such as Open Shortest Path First (OSPF), Multiprotocol Label Switching/Traffic Engineering (MPLS/TE), or any other suitable routing protocol for the network 400. For example, if the topology evaluator 320 assumes an OSPF protocol, the topology evaluator 320 assigns an OSPF weight to each IP link according to a formula (e.g., setting the weight equal to routed distance plus a constant).

In another example, the topology evaluator 320 assumes a 2-Phase Fast Reroute (FRR). More information regarding 2-Phase FRR can be found in "Models for IP/MPLS Routing Performance: Convergence, Fast Reroute and QoS Impact" by G. L. Choudhury, SPIE Volume 5598, Philadelphia, Pa., pp. 1-12, Oct. 26-27, 2004. In particular, the topology evaluator 320 reroutes traffic under different failure conditions using a first phase and a second phase. During the first phase, the topology evaluator 320 reroutes traffic using a very fast switch over to pre-determined backup tunnels between pairs of routers that are adjacent to the failure. For example, if the topology evaluator 320 simulates a failure along the physical link E, any traffic between the nodes N5 and N6 would be quickly rerouted via the physical path D-C-G-H-F. Backup tunnels may be of the Next-Hop type to handle link failures (e.g., bypasses the failed link), or of the Next-Next-Hop type to handle both router and link failures (e.g., bypasses both the failed link and the neighboring router to which the link is connected).

During the second phase, the topology evaluator 320 reroutes traffic over various end-to-end paths, taking into consideration the current state of the network. In some examples, the topology evaluator 320 achieves efficient routing of traffic using Optimized MPLS/TE, which increases sharing of bandwidth among different failure scenarios. While some example IP link topology evaluation techniques are described herein, many more IP link topology evaluation techniques are available and fall within the scope of this disclosure.

While it is possible and within the scope of this disclosure to evaluate all M possible IP link topologies, the evaluation may become computationally expensive for larger values of M. Therefore, the topology evaluator 320 may only evaluate certain values of m, such as the base case m=0 and a number of specific values of $m_p$, where p={1, 2, 3, ... }. The values of $m_p$ represent the largest values of m such that no more than p IP links are routed on any given physical link. However, for m=$m_p$+1, the largest number of IP links routed on a physical link is equal to p+1. After identifying an $m_p$* value with a lowest cost solution, the topology evaluator 320 may search for additional values of m near the $m_p$* solution to find a better solution.

Figure 15:
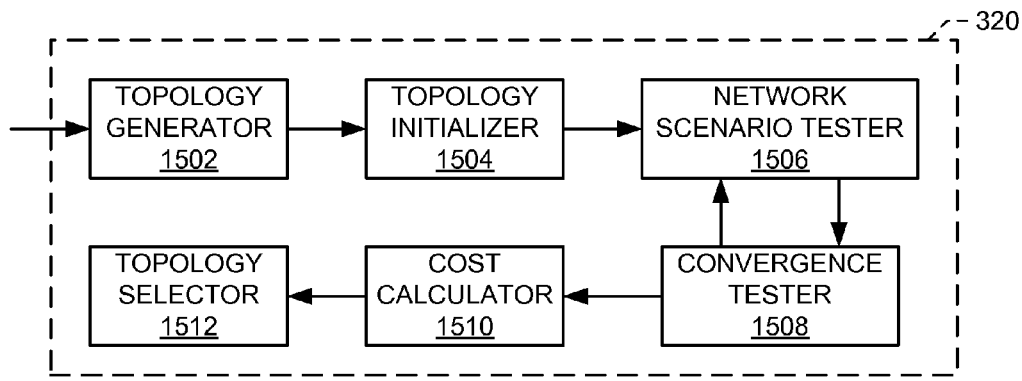
FIG. 15 is a more detailed block diagram of an example topology evaluator of FIG. 3.

An example topology evaluator 1500 that may be used to implement the topology evaluator 320 is illustrated in FIG. 15. The example topology evaluator 1500 of FIG. 15 includes a topology generator 1502, a topology initializer 1504, a network scenario tester 1506, a convergence tester 1508, a cost calculator 1510, and a topology selector 1512. The topology generator 1502 generates multiple IP link topologies by selecting different values of m as described above. For example, the topology generator 1502 may select values of m={0, 1, 2, 3} to generate 4 different IP link topologies.

The topology initializer 1504 selects an IP link topology generated by the topology generator 1504 and initializes several variables in preparation for evaluating the selected IP link topology. The topology initializer 1504 initializes the tentative capacities $c_i$ for each IP link i to be equal to a minimum capacity. As referred to herein, the capacity of an IP link is derived from one or more dedicated wavelengths or dedicated bandwidth between the endpoint nodes of the IP link via one or more physical links. Thus, the minimum capacity of the example IP links may be one 40 Gbps wavelength. The topology initializer 1504 further initializes a previous capacity $c^p_i$ of each IP link i to be equal to the tentative capacity $c_i$ of the respective IP link. Thus, the previous capacity $c^p_i$ for each IP link may also be initialized to be one 40 Gbps wavelength.

The topology initializer 1504 further assigns weights $w_i$ to each of the IP links i. The weight $w_i$ assigned to an IP link may be based on a formula determined by a network design user. For example, the weight $w_i$ of an IP link i may assign a weight to each kilometer of physical fiber (e.g., 1/km) along the path of the IP link i in addition to a constant weight (e.g., 300) representative of the IP port cost at the endpoint nodes of the IP link i. The weights are generally unitless, but may alternatively have a unit attached to them. The topology initializer 1504 may further list the elements of the traffic database 304 of FIGS. 3 and 6 in some deterministic or random order.

After the topology initializer initializes the IP link topology variables, the network scenario tester 1506 tests the IP link topology according to one or more network scenarios. The tested network scenarios may include, but are not limited to, normal network conditions (e.g., all physical links are operational), single failure conditions (e.g., one physical link and/or node has failed), single/double failure conditions (e.g., two physical links and/or nodes have failed), and/or single/double/triple failure conditions (e.g., three physical links and/or nodes have failed). The examples described below and illustrated in the drawings will refer to normal network conditions and single failure conditions but may be extended to single/double and/or single/double/triple failure scenarios in a straightforward manner.

The network scenario tester 1506 tests all desired network scenarios and outputs final capacities $c^f_i$ for each IP link i corresponding to the IP link topology. The final capacities $c^f_i$ are the upper capacities needed on each IP link i to provide survivability under each possible failure scenario tested. In some examples, the network scenario tester 1506 retests the network scenarios at least once with the determined capacities. The network scenario tester 1506 is described in more detail below with reference to FIG. 16.

The convergence tester 1508 then determines whether the IP link capacities $c_i$ have substantially changed from the previous capacities $c^p_i$. If any of the IP link capacities $c_i$ substantially change (i.e., have not converged), the convergence tester 1508 sets the previous IP link capacities $c^p_i$ to be equal to the most recent IP link capacities $c_i$ and cause the network scenario tester 1506 to retest again. The convergence tester 1508 and the network scenario tester 1506 may repeat the network scenario tests and convergence tests multiple times until the IP link capacities $c_i$ are substantially the same from one test to a subsequent test (i.e., the IP link capacities $c_i$ have converged).

When the IP link capacities $c_i$ have converged, the cost calculator 1510 determines the cost associated with each IP link topology based on the IP link capacities $c_i$ determined by the network scenario tester 1506. The cost calculator 1510 may use a cost function having a portion based on the capacity-distance (e.g., wavelength-km) of the IP link and a fixed portion to represent fixed costs associated with the IP link. After the cost calculator 1510 determines the costs of each IP link topology, the topology selector 1512 selects an IP link topology based on the cost. Because each IP link topology has the required survivability but different cost, the topology selector 1512 uses the cost as the primary differentiator between the IP link topologies. However, the topology selector 1512 may additionally or alternatively use auxiliary factors when selecting an IP link topology.

Figure 16:
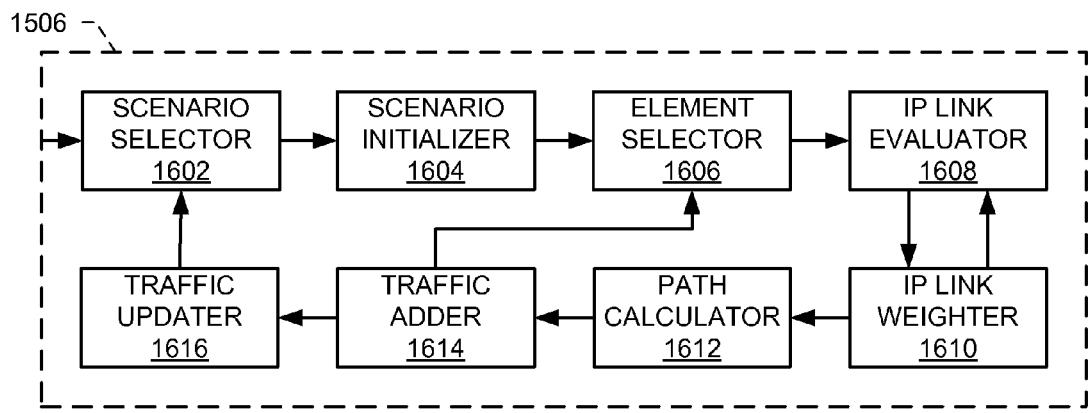
FIG. 16 is a more detailed block diagram of an example network scenario tester.

FIG. 16 is a more detailed block diagram of the example network scenario tester 1506 of FIG. 15 using Optimized MPLS/TE for routing traffic. As mentioned above, the network scenario tester 1506 tests network scenarios and outputs capacities for each IP link i corresponding to the IP link topology under test. The example network scenario tester 1506 includes a scenario selector 1602, a scenario initializer 1604, an element selector 1606, an IP link evaluator 1608, an IP link weighter 1610, a path calculator 1612, a traffic adder 1614, and a traffic updater 1616. The network scenario tester 1506 is invoked after the topology initializer 1504 initializes the capacities for a particular IP link topology to be tested, outputs the IP link capacities $c_i$ for the IP link topology based on all network scenarios, and may be repeatedly invoked by the convergence tester 1508 based on the capacities output by the network scenario tester 1506.

When the network scenario tester 1506 is invoked, the scenario selector 1602 selects a first network scenario for testing or consideration. The scenario initializer 1604 initializes the maximum traffic $T_i$ for each IP link i encountered over all network scenarios to be zero and initializes the traffic $t_i$ on each IP link i for the first network scenario to be zero.

After initializing the scenario, the element selector 1606 selects an element from the traffic database 306, which is ordered by the topology initializer 1504. The IP link evaluator 1608 evaluates each IP link i and determines, given the capacity of the IP link $c_i$ and the traffic on the IP link $t_i$, whether the IP link i can support the traffic demand associated with the traffic element. If the IP link i has enough remaining capacity to support the traffic demand, the IP link weighter 1610 does not change the weight $w_i$ of the IP link i. However, if the IP link i would need additional capacity to handle the traffic demand, the IP link weighter 1610 adds a penalty to the weight $w_i$ of the IP link i. The tentative capacities $c_i$ used by the network scenario tester 1506 of FIG. 16 may be an initial capacity as described above. Alternatively, the tentative capacities $c_i$ may be previously generated by the network scenario tester 1506 during a previous test.

The IP link weighter 1610 may add an additive or multiplicative penalty to the weight $w_i$ when there is not enough tentative capacity $c_i$ to support the traffic demand in addition to the traffic $t_i$. An example additive weight would be representative of the cost to route or reroute traffic over the IP link i, such as a wavelength-distance penalty and a fixed penalty. The penalties may be automatically determined via a penalty function and/or may be user-provided. Additionally, the penalties may be applied uniformly to multiple IP links and/or the penalties may be individualized to each IP link.

After the IP link evaluator 1608 and the IP link weighter 1610 have evaluated and weighted all the IP links i for the selected traffic element, the path calculator 1612 determines a shortest path for the traffic demand in the selected traffic element. The selected traffic element has a source node and a destination node that are used as start and end points between which the traffic is routed. To select the path, the example path calculator 1612 determines the series of IP links that results in the lowest total weight. If capacity must be added to any one or more of the IP links to support the traffic, the path calculator 1612 may increase the tentative capacity(ies) $c_i$. In the illustrated example, the tentative capacities $c_i$ may only be increased by available capacity units (e.g., one 40 Gbps wavelength). Thus, if the path calculator 1612 adds 5 Gbps of traffic to an IP link i having a tentative capacity $c_i$ of 40 Gbps and traffic $t_i$ of 37 Gbps, where the path calculator 1612 may only add 40 Gbps wavelengths to increase capacity, the path calculator 1612 will add another 40 Gbps wavelength to increase the tentative capacity $c_i$ to 80 Gbps. The traffic demand in the selected traffic element may then be added to the IP link i.

After the path calculator 1612 determines the shortest path, the traffic adder 1614 updates the traffic $t_i$ on each of the IP links i selected by the path calculator 1612 to handle the selected traffic element. After the traffic adder 1614 has updated the traffic $t_i$, control may return to the element selector 1606 to select another traffic element from the traffic database 304 or may advance to the traffic updater 1616 if all of the traffic elements have been added to the selected network scenario.

The traffic updater 1616 examines the IP links i for the selected network scenario. If, for any of the IP links i, the traffic $t_i$ is greater than the upper traffic $T_i$, the traffic updater 1616 sets the upper traffic $T_i$ to be equal to the traffic $t_i$ for that IP link i. Control then returns to the scenario selector 1602 to select another network scenario for consideration. If all network scenarios have been considered, the network scenario tester 1506 may transfer control to the convergence tester 1508 of FIG. 15.

Figures 17, 18:
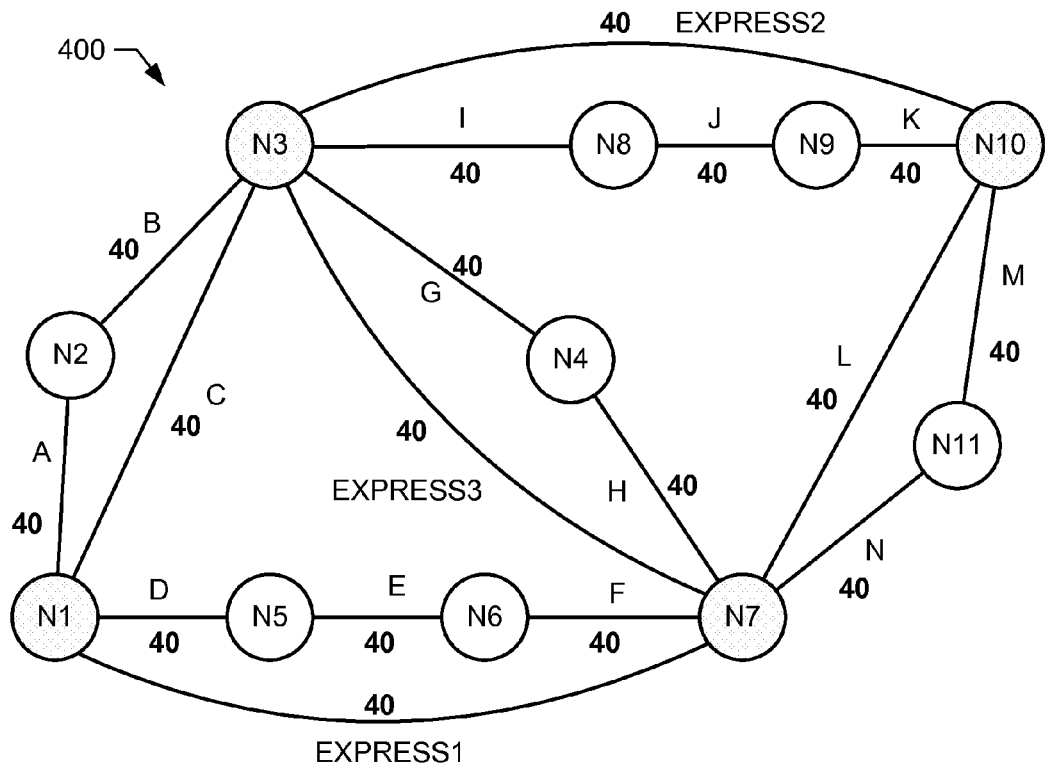
FIG. 17 is a table of example IP links determined by the network designer of FIGS. 1 and 3 after being initialized by the topology initializer of FIG. 15.
FIG. 18 illustrates the example optical network of FIG. 4 in accordance with the corresponding initialized capacities of FIG. 17 in units of gigabits per second.

FIG. 17 is a table 1700 of the example IP links determined by the network designer 102 of FIGS. 1 and 3 after being initialized by the topology initializer 1504 of FIG. 15. In the examples of FIGS. 17-20, the IP links A-N will represent IP links having a path over the physical link of the same name (i.e., A-N). Thus, the IP link A is routed between nodes N1 and N2 via the physical link A. The IP links have corresponding weights as calculated by the topology initializer 1504. The example weights $w_i$ are determined by the formula $w_i$= (IP link distance in km)/385+1. Thus, the weights $w_i$ include a distance-based factor and a fixed factor, where the fixed factor is equivalent to 385 km of distance. The example table further includes the upper traffic $T_i$, the tentative capacity $c_i$, and the utilization of each IP link. The utilization of an IP link is the upper traffic $T_i$ as a percentage of the tentative capacity $c_i$. The initial capacities of the IP links are equal to one 40 Gbps wavelength in each direction between the endpoint nodes of the respective IP links. While the traffic on the IP links is directional, the upper traffic $T_i$ of an IP link i reflects the larger upper traffic of the two directions on the IP link i. FIG. 18 illustrates the IP links of FIG. 17 associated with the example optical network of FIG. 4 and the corresponding initialized capacities in units of Gbps.

The scenario selector 1602 of FIG. 16 selects a network scenario (e.g., normal network conditions, single failure condition). FIG. 19 is the table 1700 of FIG. 17 after the element selector 1606, the IP link evaluator 1608, the IP link weighter 1610, the path calculator 1612, and the traffic adder 1614 have added several traffic elements from the traffic database 304 of FIG. 3 to the IP links in the selected network scenario. As illustrated in FIG. 19, the tentative capacities $c_i$ of the IP links A, EXPRESS1, and EXPRESS2 have each been increased by one 40 Gbps wavelength to 80 Gbps.

Suppose the element selector 1606 selects the traffic element having a source N2 and a destination N4, with a traffic 23.91 Gbps. The IP link evaluator 1608 evaluates each of the IP links i to determine whether each IP link i can support the 23.91 Gbps within its tentative capacity $c_i$ given the current traffic $t_i$ on the IP link i while remaining below an upper utilization constraint (e.g., 0.95). In the illustrated example, the IP links A, D, G, H, and EXPRESS2 can fit the traffic and, thus, the IP link weighter 1610 does not apply a penalty. However, the remaining IP links must increase their respective capacities $c_i$ to fit the traffic and/or comply with the upper utilization constraint. Thus, the IP link weighter 1610 applies penalties to the IP links B, C, E, F, I, J, K, L, M, N, EXPRESS1, and EXPRESS 2. In the illustrated example, the penalties applied by the weighter 1610 are individualized to the IP links i.

FIG. 20 illustrates the IP links of FIG. 19 associated with the example optical network of FIG. 4 and the corresponding weights, including the penalties applied by the IP weighter 1612. The path calculator 1612 calculates an IP link path for the traffic by adding the weights along the different paths. For example, the path B-G via nodes N2-N3-N4 has a total weight 10.76 and the path A-EXPRESS1-H via nodes N2-N1-N7-N4 has a total weight 23.84. Thus, the path B-G has the lowest weight, and the path calculator 1612 adds the traffic from N2 to N4 to the traffic $t_i$ on each of the IP links B and G. As a result, the path calculator 1612 must add an additional 40 Gbps wavelength to the IP link B because the traffic will exceed the tentative capacity $c_i$ of the IP link B. The path calculator 1612 outputs the selected path to the traffic adder 1614, which updates the upper traffic $T_i$ for the IP links B and G and retains the upper traffic $T_i$ for all other IP links i.

In some examples, the network scenario tester 1506 may apply one or more latency or delay constraints. The network scenario tester 1506 associates with each IP link some amount of latency (i.e., delay). The total latency of a path is the sum of the latencies on the IP links that make up the path. If desired, the network design user may require that, within any given network scenario, the latency on the route that is actually taken by router-to-router traffic must satisfy some constraints. For example, if $D_1$ is the latency of the shortest physical path between a specific pair of routers in that given network scenario, and $D_2$ is the latency of the route actually taken a user may apply constraints on the upper size(s) of $D_2-D_1$ and/or $D_2/D_1$. In the example of FIG. 16, the path calculator 1612 may apply the constraints by determining whether the shortest path based on the weights including any penalties (e.g., as applied by the IP link weighter 1610) violates a latency constraint, the path calculator 1612 causes the IP link weighter 1610 to reduce all penalties by half. The path calculator 1610 then recomputes the route using the weights with reduced penalties. The path calculator 1612 and the IP link weighter 1610 may repeat this process until the latency constraint is reduced.

In some other examples, the network scenario tester 1506 may consider priority traffic to be different than other traffic. For example, a network design user may specify that a subset of the traffic demand in each traffic element of the traffic database 304 of FIG. 3 is "priority" traffic that should take the shortest possible route under any network scenario. Thus, the network scenario tester 1506 may evaluate the priority traffic prior to routing or evaluating the remainder of the traffic. For such priority traffic, the IP link weighter 1610 does not apply penalties to the normal weights.

While an example manner of implementing the network designer 102 of FIG. 1 has been illustrated in FIGS. 3, 15, and 16, one or more of the elements, processes and/or devices illustrated in FIGS. 3, 15, and 16 may be combined, divided, re-arranged, omitted, eliminated and/or implemented in any other way. Further, the example topology database 302, the example traffic database 304, the example initial IP links database 306, the example potential express links database 308, the example chosen express links database 310, the example IP link identifier 312, the example express link identifier 314, the example traffic evaluator 316, the example express link evaluator 318, and/or the example topology evaluator 320 of FIG. 3, the example topology generator 1502, the example topology initializer 1504, the example network scenario tester 1506, the example convergence tester 1508, the example cost calculator 1510, and/or the example topology selector 1512 of FIG. 15, the example scenario selector 1602, the example scenario initializer 1604, the example element selector 1606, the example IP link evaluator 1608, the example IP link weighter 1610, the example path calculator 1612, the example traffic adder 1614, and/or the example traffic updater 1616 of FIG. 16, and/or, more generally, the example network designer 102 of FIG. 3 may be implemented by hardware, software, firmware and/or any combination of hardware, software and/or firmware. Thus, for example, any of the example topology database 302, the example traffic database 304, the example initial IP links database 306, the example potential express links database 308, the example chosen express links database 310, the example IP link identifier 312, the example express link identifier 314, the example traffic evaluator 316, the example express link evaluator 318, and/or the example topology evaluator 320, the example topology generator 1502, the example topology initializer 1504, the example network scenario tester 1506, the example convergence tester 1508, the example cost calculator 1510, and/or the example topology selector 1512, the example scenario selector 1602, the example scenario initializer 1604, the example element selector 1606, the example IP link evaluator 1608, the example IP link weighter 1610, the example path calculator 1612, the example traffic adder 1614, and/or the example traffic updater 1616, and/or, more generally, the example network designer 102 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any of the appended apparatus claims are read to cover a purely software and/or firmware implementation, at least one of the example topology database 302, the example traffic database 304, the example initial IP links database 306, the example potential express links database 308, the example chosen express links database 310, the example IP link identifier 312, the example express link identifier 314, the example traffic evaluator 316, the example express link evaluator 318, and/or the example topology evaluator 320, the example topology generator 1502, the example topology initializer 1504, the example network scenario tester 1506, the example convergence tester 1508, the example cost calculator 1510, and/or the example topology selector 1512, the example scenario selector 1602, the example scenario initializer 1604, the example element selector 1606, the example IP link evaluator 1608, the example IP link weighter 1610, the example path calculator 1612, the example traffic adder 1614, and/or the example traffic updater 1616 are hereby expressly defined to include a tangible medium such as a memory, DVD, CD, etc. storing the software and/or firmware. Further still, the example network designer 102 of FIG. 3 may include one or more elements, processes and/or devices in addition to, or instead of, those illustrated in FIG. 3, and/or may include more than one of any or all of the illustrated elements, processes and devices.

Figure 21:
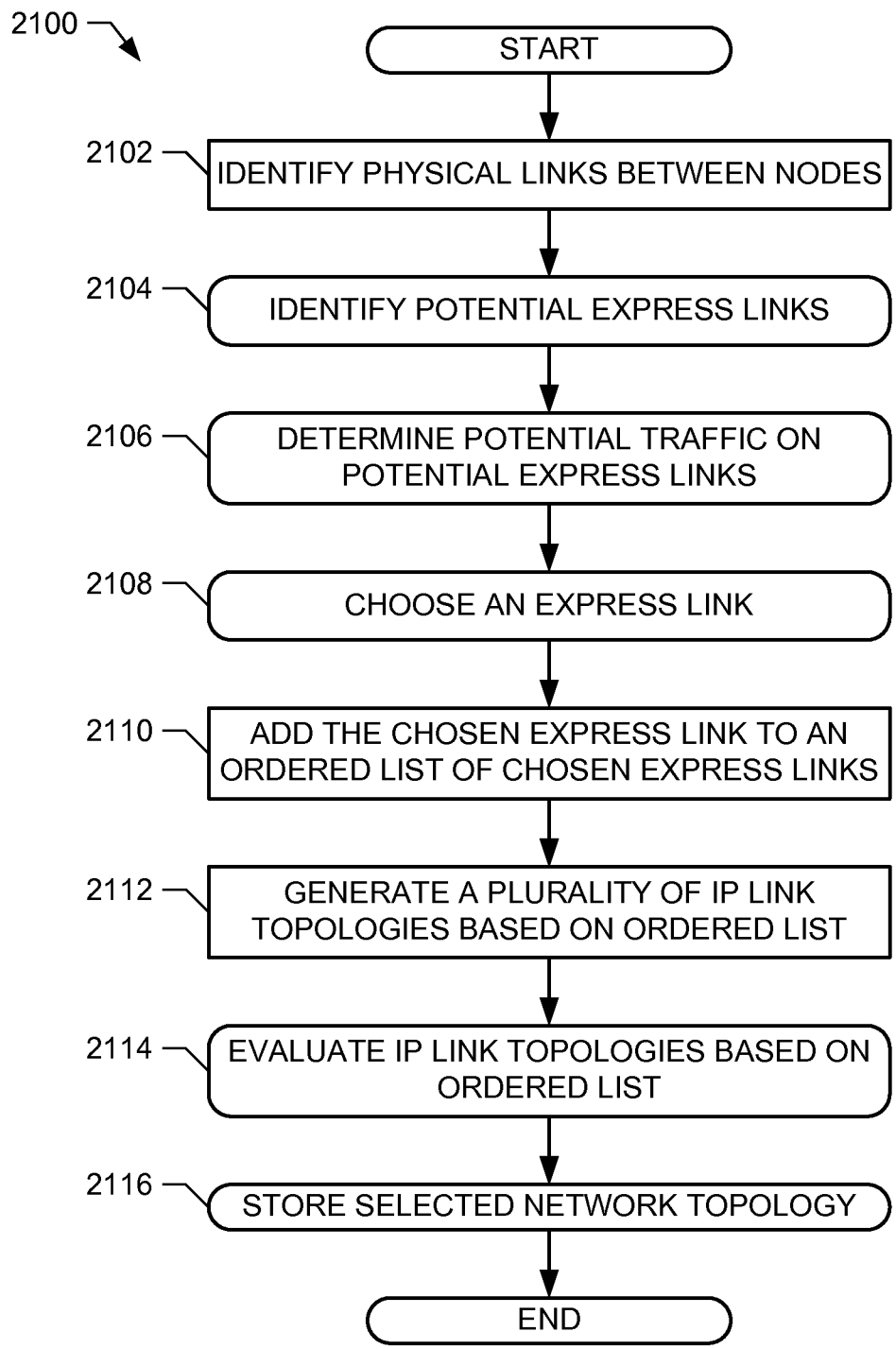
FIG. 21 is a flowchart depicting an example process, which may be implemented using, for example, machine readable instructions that may be executed to design a survivable IP link topology.

FIG. 21 is a flowchart depicting an example process, which may be implemented using, for example, machine readable instructions 2100 that may be executed to design a survivable IP link topology. The example instructions 2100 may be executed by the network designer 102 of FIGS. 1 and 3 to generate a survivable IP link topology.

The instructions 2100 begin by identifying (e.g., via the IP link identifier 312 of FIG. 3) the physical links (e.g., optical fibers) between the nodes of an IP network (block 2102). The IP link identifier 312 may identify the nodes by evaluating a database (e.g., the topology database 302 of FIG. 3) populated by, for example, a network design user or by any other source of information. The express link identifier 314 of FIG. 3 then identifies potential express links from the physical links (block 2104). As mentioned above, potential express links may be identified from backbone nodes that are in contact with more than two other nodes. An example process to identify potential express links is described in more detail below with reference to FIG. 22.

The traffic evaluator 316 of FIG. 3 determines the potential traffic on the potential express links (block 2106). An example process to determine the potential traffic on the potential express links is described in more detail below with reference to FIG. 23. The express link evaluator 318 of FIG. 3 chooses an express link from a database of potential express links (e.g., the potential express link database 308 of FIG. 3) (block 2108). An example process to choose an express link is described in more detail below with reference to FIG. 24. After choosing an express link, the express link evaluator 318 adds the chosen express link to an ordered list of chosen express links (block 2110). For example, the express link evaluator 318 may add the chosen express link to the bottom of the chosen express links database 310 of FIG. 3.

The topology evaluator 320 (e.g., via the topology generator 1502 of FIG. 15) then generates two or more IP link topologies based on the ordered list (block 2112). To generate an IP link topology, the topology evaluator 320 may, for example, select the first m chosen express links in the chosen express links database 310 to be added to the IP link topology in addition to the initial list of IP links. After generating a number of IP link topologies, the topology evaluator 320 evaluates the generated IP link topologies (block 2114). An example process to evaluate the IP link topologies is described below with reference to FIG. 25. When evaluating the IP link topologies, the example topology evaluator 320 selects one of the IP link topologies for implementation in an optical network. After selecting one of the IP link topologies, the topology evaluator 320 stores the selected IP link topology (block 2116). After storing the IP link topology, the example instructions 2100 may end.

Figure 22:
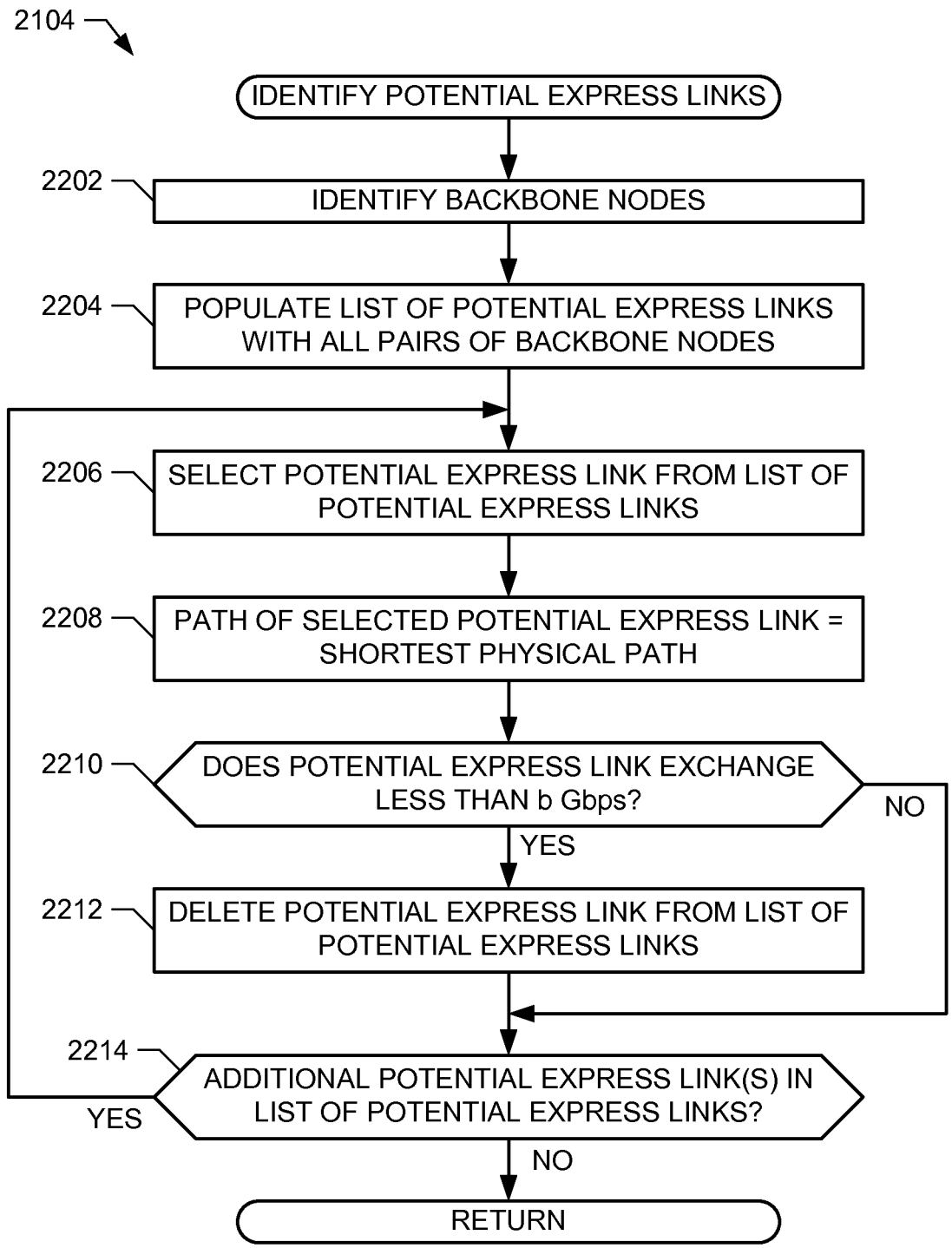
FIG. 22 is a flowchart depicting an example process, which may be implemented using, for example, machine readable instructions that may be executed to identify potential express links.

FIG. 22 is a flowchart depicting an example process, which may be implemented using, for example, machine readable instructions 2104 that may be executed to identify potential express links. The instructions 2104 may be executed to implement the example express link identifier 314 of FIG. 3. The express link identifier 314 begins identifying potential express links by identifying one or more backbone nodes (block 2202). Backbone nodes may be defined as nodes (e.g., the nodes N1-N11 of FIG. 4) directly coupled to three or more other nodes. The express link identifier 314 then populates a list or database of potential express links (e.g., the potential express links database 308 of FIG. 3) with all pairs of identified backbone nodes (block 2204). The example potential express links are represented as bidirectional, but may be represented as omnidirectional (i.e., representing both directions) links.

The express link identifier 314 then selects a potential express link from the potential express links database 308 (block 2206). The express link identifier 314 determines the path of the potential express link to be the shortest physical path between the endpoint nodes of the potential express link (block 2208). The physical distances are provided by, for example, the topology database 302 of FIG. 3. If the selected potential express link exchanges less than b Gbps of traffic (e.g., determined from the traffic database 304 of FIG. 3) (block 2210), the example express link identifier 314 deletes the link from the potential express links database 308 (block 2212). Because the potential express links may exchange different amounts of traffic in different directions, the express link identifier 314 may choose to retain the potential express link if more than b Gbps of traffic is exchanged in at least one direction, or may choose to delete the potential express link if less than b Gbps of traffic is exchanged in at least one direction. The example express link identifier 314 does not retain any potential express links that exchange traffic in one direction (i.e., delete half of a potential express link).

After deleting a potential express link (block 2210), or if the selected potential express link exchanges at least b Gbps of traffic (block 2208), the express link identifier 314 determines whether there are any additional potential express links in the potential express links database 308 that have not yet been selected (block 2212). If there are additional potential express links to be selected (block 2212), control returns to block 2206 to select another potential express link. If there are no additional potential express links (block 2212), the example instructions 2104 end and control returns to block 2106 of FIG. 21.

Figure 23:
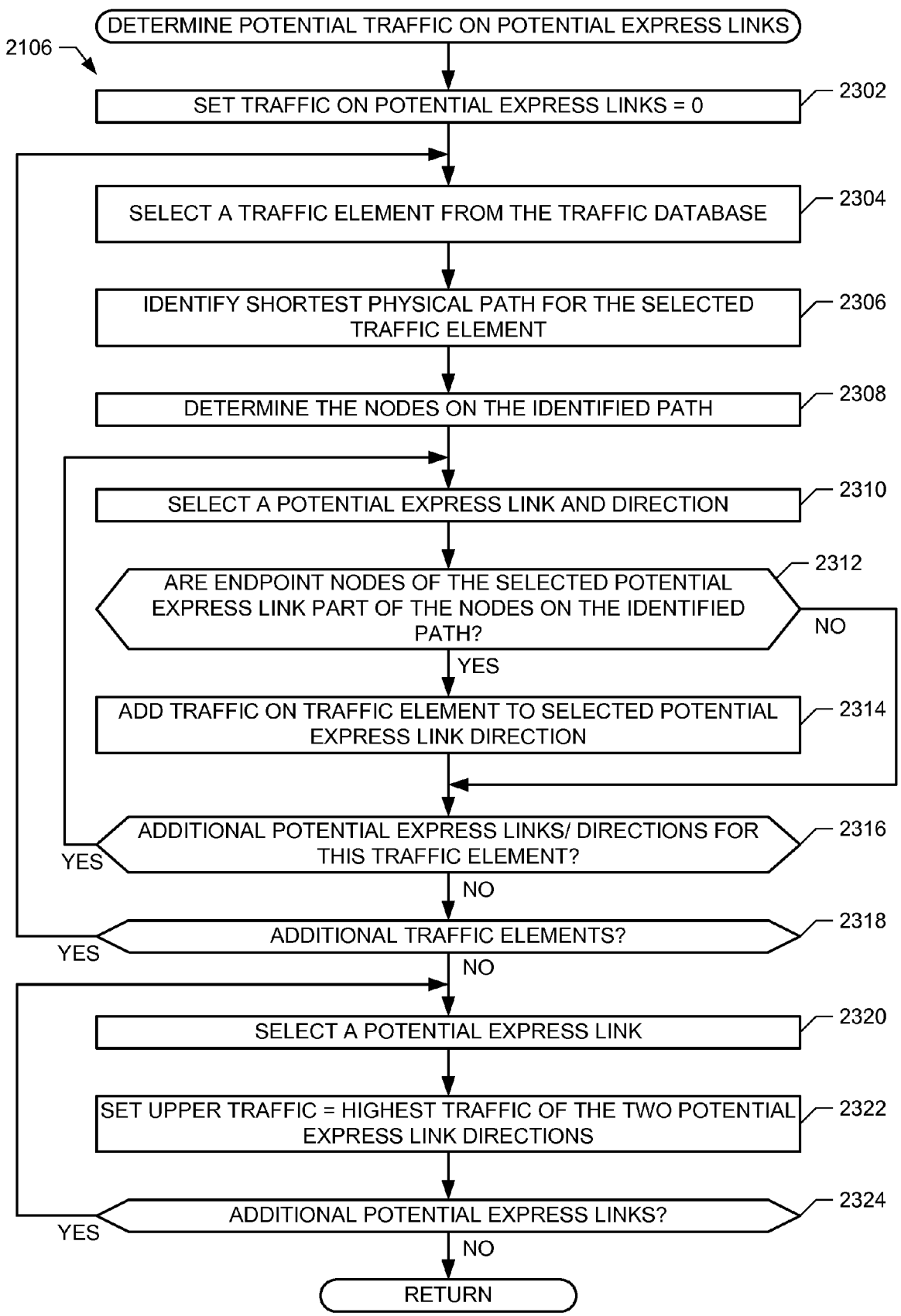
FIG. 23 is a flowchart depicting an example process, which may be implemented using, for example, machine readable instructions that may be executed to determine potential traffic on potential express links.

FIG. 23 is a flowchart depicting an example process, which may be implemented using, for example, machine readable instructions 2106 that may be executed to determine potential traffic on potential express links. The example instructions 2106 may be executed to implement the traffic evaluator 316 of FIG. 3. The traffic evaluator 316 begins by setting the traffic on the potential express links in the potential express links database 308 to zero (block 2302). In this example, the potential express links have directional traffic that is evaluated independent of the traffic in the opposite direction. The traffic evaluator 316 selects a first traffic element from the traffic database 304 of FIG. 3 (block 2304). The traffic element specifies an amount of traffic (e.g., in Gbps) between a source node and a destination node (i.e., the endpoint nodes) as illustrated in FIG. 6. Based on the topology database 302 of FIG. 3, the traffic evaluator 316 determines the shortest physical path between the endpoint nodes of the traffic element (block 2306). The traffic evaluator 316 further determines the nodes (e.g., N1 to N11) lying along the shortest physical path (block 2308).

The traffic evaluator 316 then selects a potential express link from the potential express links database 308 and one of the directions of the selected potential express link (block 2310). Based on the direction, the traffic evaluator 316 determines whether both endpoint nodes of the potential express link are among the nodes on the identified physical path (block 2312). If both endpoint nodes are on the identified physical path (block 2312), the traffic evaluator 316 adds the traffic corresponding to the selected traffic element to the directional traffic on the potential express link and direction (block 2314).

After adding the traffic (block 2314) or if the identified physical path does not include both endpoint nodes (block 2312), the traffic evaluator 316 determines whether there are additional potential express links and/or directions to be evaluated for the selected traffic element (block 2316). If there are additional potential express links and/or directions (block 2316), control returns to block 2310 to select another potential express link and/or direction. Blocks 2310-2316 may loop to evaluate all directions on all potential express links in the potential express links database 308 for the selected traffic element.

If there are no remaining potential express links or directions to be evaluated against the selected traffic element (block 2316), the traffic evaluator 316 determines whether there are additional traffic elements to be evaluated in the traffic database 304 (block 2318). If there are additional traffic elements (block 2318), control returns to block 2304 to select another traffic element from the traffic database 304. Blocks 2304-2318 loop to evaluate all of the traffic elements in the traffic database 304.

When there are no remaining traffic elements to be evaluated (block 2318), the traffic evaluator 316 selects a first potential express link from the potential express links database 308 (block 2320). For the selected potential express link, the traffic evaluator 316 sets the upper traffic to be the higher traffic of the two directional traffics for the potential express link (block 2322). For example, if the traffic from A to B is higher than the traffic from B to A for the A-B potential express link, the upper traffic of the A-B potential express link is set to be the traffic from A to B. After setting the upper traffic for the selected potential express link, the traffic evaluator 316 determines whether there are additional potential express links to set (block 2324). If there are additional potential express links (block 2324), control returns to block 2320 to select another potential express link. Blocks 2320-2324 may loop for some or all of the potential express links in the potential express link database 308. If there are no remaining potential express links (block 2324), the example instructions 2106 end and control returns to block 2108 of FIG. 21.

Figure 24:
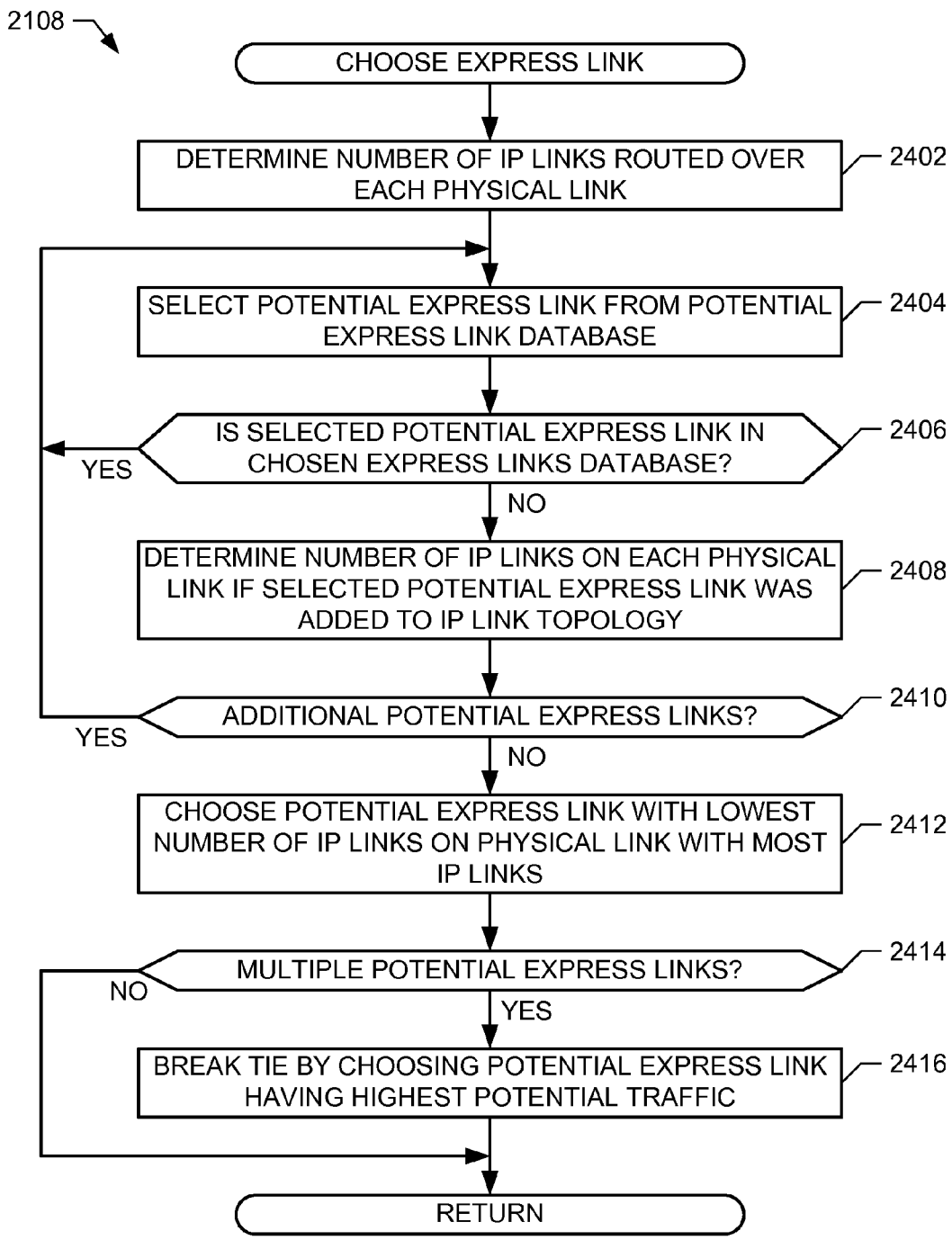
FIG. 24 is a flowchart depicting an example process, which may be implemented using, for example, machine readable instructions that may be executed to choose an express link.

FIG. 24 is a flowchart depicting an example process, which may be implemented using, for example, machine readable instructions 2108 that may be executed to choose an express link. The example instructions 2108 may be executed by the express link evaluator 318 of FIG. 3 to implement block 2108 of FIG. 21. The express link evaluator 318 begins by determining the number of IP links routed over each physical link (block 2402). The number of IP links is based on the initial IP links database 306 and the chosen express links database 310 of FIG. 3.

The express link evaluator 318 then selects a potential express link from the potential express links database 308 (block 2404). The express link evaluator 318 further determines whether the potential express link is already listed in the chosen express links database 310 (block 2406). If the potential express link is in the chosen express links database 310 (block 2406), the express link evaluator 318 ignores the potential express link and control returns to block 2404 to select another potential express link.

If the potential express link is not in the chosen express links database (block 2406), the express link evaluator 318 determines the number of IP links that would be on each of the physical links if the selected potential express link were added to the IP link topology (block 2408). To determine the number of IP links, the example express link evaluator 318 uses the shortest physical route between the endpoint nodes of the selected potential express link. The express link evaluator 318 then determines whether there are additional potential express links to be evaluated (block 2410). If there are additional potential express links (block 2410), control returns to block 2404 to select the next potential express link from the potential express links database 308.

If there are no additional potential express links (block 2410), the express link evaluator 318 chooses the potential express link that has the lowest number of IP links on the physical link having the most IP links (block 2412). In other words, if a first potential express link adds one IP link to each of five physical links, where the physical link having the highest number of IP links would have four IP links, and a second potential express link adds one IP link to each of three physical links but the physical link having the highest number of IP links would have five IP links, the express link evaluator 318 chooses the first potential express link to avoid increasing the highest number of IP links on a given physical link.

The express link evaluator 318 also determines whether multiple potential express links have an equal number of IP links on the physical link having the highest number of IP links (block 2414). If there are multiple potential express links (block 2414), the express link evaluator 318 breaks the tie by choosing from the tied potential express links the potential express link having the highest potential traffic (e.g., determined from the potential express links database 308) (block 2416). If there are no tied potential express links (block 2414) or after breaking the tie (block 2416), the example instructions 2108 may end and control returns to block 2110 of FIG. 21.

Figure 25:
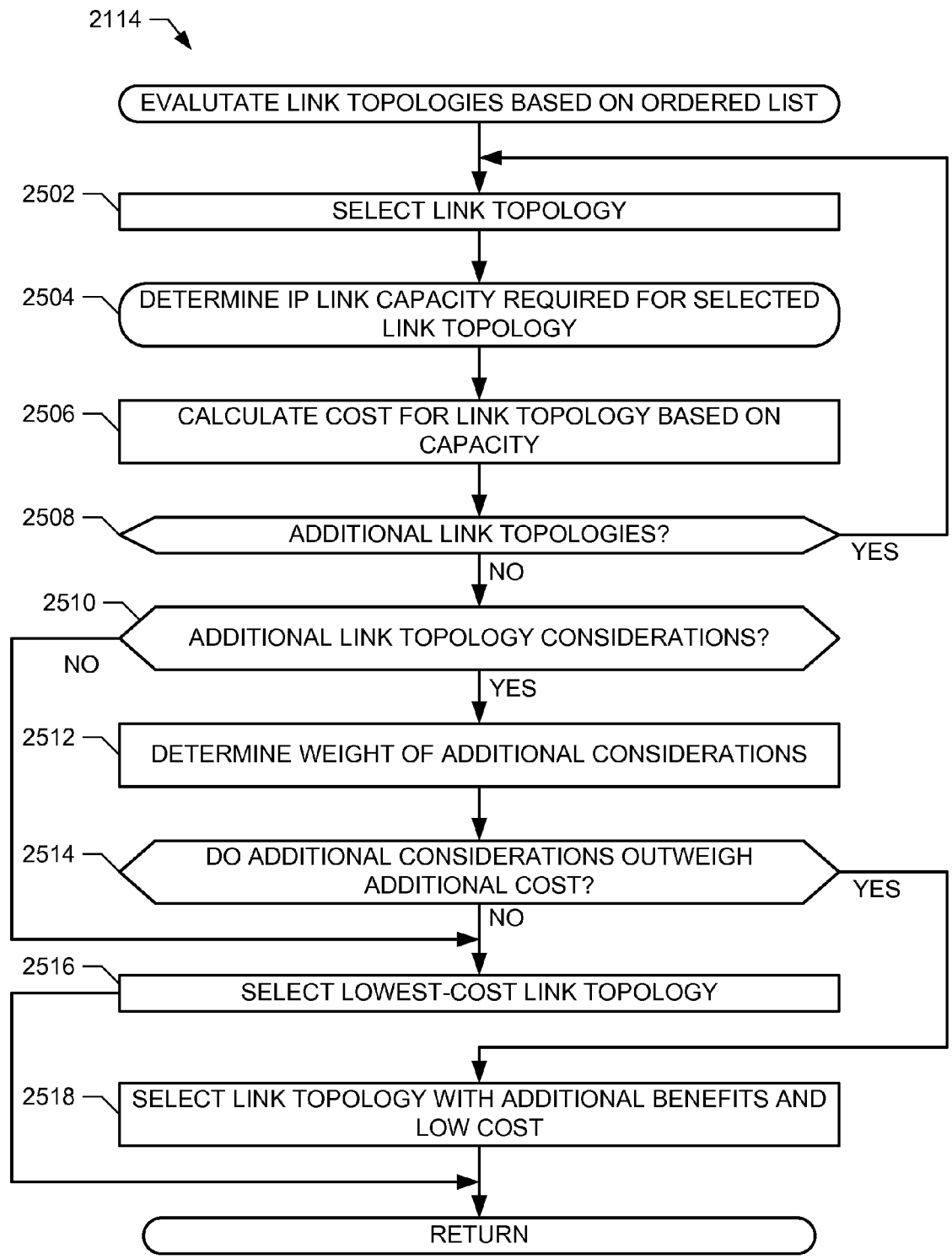
FIG. 25 is a flowchart depicting an example process, which may be implemented using, for example, machine readable instructions that may be executed to evaluate IP link topologies.

FIG. 25 is a flowchart depicting an example process, which may be implemented using, for example, machine readable instructions 2114 that may be executed to evaluate IP link topologies. The example instructions 2114 may be executed by the topology evaluator 320 of FIG. 3 to implement block 2114 of the instructions 2100 of FIG. 21. After the topology evaluator 320 has generated two or more IP link topologies (block 2112 of FIG. 21), the topology evaluator 320 selects a first IP link topology (block 2502). The topology evaluator 320 determines the IP link capacity required to implement the selected link topology (block 2504). An example process to implement block 2504 is described below with reference to FIG. 26.

After determining the required capacity, the topology evaluator 320 (e.g., via the cost calculator 1510 of FIG. 15) calculates the cost associated with the determined capacity (block 2506). The topology evaluator 320 then determines whether there are additional IP link topologies to be evaluated (block 2508). If there are any additional IP link topologies for which a capacity and/or a cost have not been determined, control returns to block 2502 to select another IP link topology. Blocks 2502-2508 may iterate to determine the required IP link capacities and costs corresponding to the IP link topologies generated by the topology evaluator 320.

When there are no remaining IP link topologies (block 2508), the topology evaluator 320 (e.g., via the topology selector 1512 of FIG. 15) determines whether there are any additional IP link topology considerations (block 2510). Example considerations may include lower utilization ratios or other desirable features of an optical network that may not be reflected in a cost analysis. If there are additional considerations (block 2510), the topology selector 1512 determines the weight of the additional considerations (e.g., relative to the weight of the additional cost to implement an alternative IP link topology) (block 2512). The topology selector 1512 determines whether the additional consideration(s) outweigh the additional cost of implementing the alternative topology (block 2514).

If the additional considerations do not outweigh the additional cost (block 2514), the topology selector 1512 defaults to selecting the lowest-cost IP link topology for implementation into the network (block 2516). If the additional considerations at least partially outweigh the additional cost (block 2514), the topology selector 1512 may select an IP link topology according to the additional considerations that is close in cost to the lowest-cost IP link topology (block 2518). After selecting an IP link topology (block 2516 or 2518), the example instructions 2114 end and output the selected IP link topology (e.g., from the topology evaluator 320 and/or the network designer 102 of FIG. 3).

Figure 26:
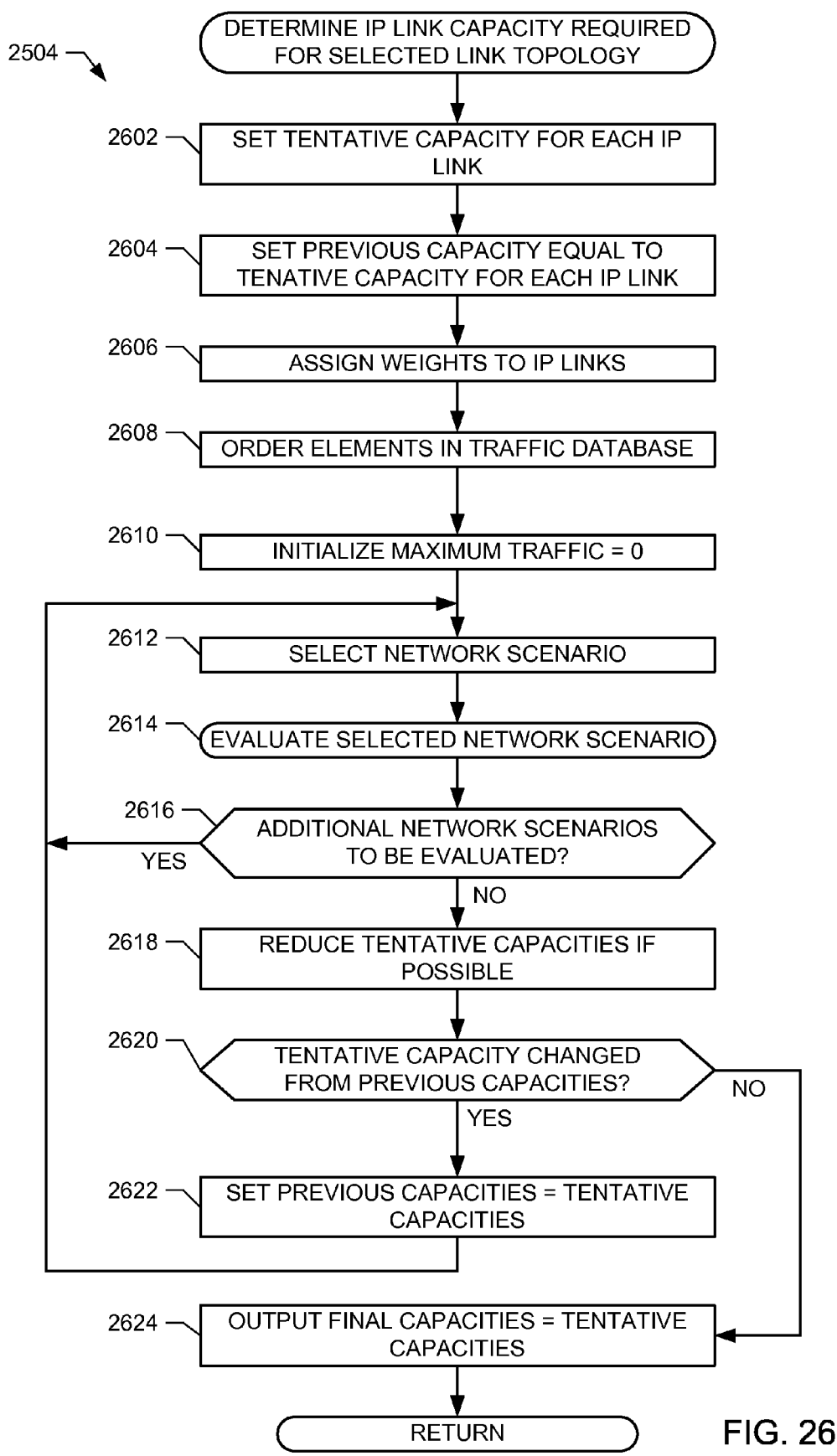
FIG. 26 is a flowchart depicting an example process, which may be implemented using, for example, machine readable instructions that may be executed to determine the IP link capacity to implement an IP link topology.

FIG. 26 is a flowchart depicting an example process, which may be implemented using, for example, machine readable instructions 2504 that may be executed to determine the IP link capacity to implement an IP link topology using Optimized MPLS/TE to route traffic. In contrast to shortest path routing with OSPF, Optimized MPLS/TE considers available IP link capacities when routing. The example instructions 2504 may be executed by, for example, the topology evaluator 320 of FIG. 15 to implement the topology evaluator 320 of FIG. 3 and/or block 2504 of FIG. 25. The example topology evaluator 320 of FIG. 15 (e.g., via the topology initializer 1504) begins by setting a tentative capacity $c_i$ equal to a lower capacity for each IP link i (block 2602). For example, the topology initializer 1504 may set the tentative capacities $c_i$ equal to one 40 Gbps wavelength unit of capacity for each of the IP links i. The topology initializer 1504 further sets a previous capacity $c^p_i$ equal to the tentative capacity $c_i$ for each of the IP links i (block 2604). The example topology initializer 1504 then assigns weights $w_i$ to each of the IP links i (block 2606). For example, the topology initializer 1504 may assign a weight $w_i$ based on the physical distance between the endpoint nodes of the IP link i and a fixed cost of establishing the IP link i. Additionally, the topology initializer 1504 arranges the traffic elements in the traffic database 304 in order (block 2608). The arrangement of the traffic elements may be in any convenient order. The topology initializer 1504 further initializes an upper traffic $T_i$ variable for each of the IP links i to be zero (block 2610). The upper traffic $T_i$ variable holds the upper amount of traffic that may be encountered by a given IP link i among all considered network scenarios.

The network scenario tester 1506 (e.g., via the scenario selector 1602) then selects a first network scenario to be considered (block 2612). The network scenarios to be tested may include normal network conditions and any potential failure scenarios against which a network design user may wish to guard the network (e.g., single failure, single/double failure, single/double/triple failure). The network scenario tester 1506 evaluates the selected network scenario (block 2614). An example process to implement block 2614 is described below with reference to FIG. 27. By evaluating a network scenario, the network scenario tester 1506 determines and updates the upper traffic $T_i$ and the tentative capacities $c_i$ of the IP links i. After evaluating the selected network scenario, the network scenario tester 1506 determines whether there are any remaining network scenarios to be tested (block 2616). If there are additional network scenarios to be tested (block 2616), control returns to block 2612 to select the next network scenario.

If there are no additional network scenarios (block 2616), the convergence tester 1508 reduces the tentative capacities $c_i$ where possible (block 2618). For example, the convergence tester 1508 may cause the network scenario tester 1506 to automatically run blocks 2612-2616 again a second time using the updated tentative capacities $c_i$ (i.e., capacities that are not initially at a minimum capacity). In the illustrated example, the tentative capacities $c_i$ are reduced, if at all, by whole 40 Gbps wavelength units of capacity while still supporting the respective upper traffic $T_i$ and complying with utilization constraints. After running the network scenario test a second time, the convergence tester 1508 determines whether any of the tentative capacities $c_i$ are reduced from the previous capacities $c^p_i$ (block 2620). If any of the example tentative capacities $c_i$ are changed from the previous capacities $c^p_i$ (block 2620), the convergence tester 1508 sets the previous capacities $c^p_i$ equal to the tentative capacities $c_i$ for each of the IP links i (block 2622). Control then returns to block 2612 to retest the network scenarios again.

If none of the tentative capacities $c_i$ are reduced (block 2620), the convergence tester 1508 sets the tentative capacities $c_i$ as final capacities $c_f$ and outputs the final capacities $c_f$ to, for example, the cost calculator 1510 of FIG. 15 (block 2624).

Figure 27:
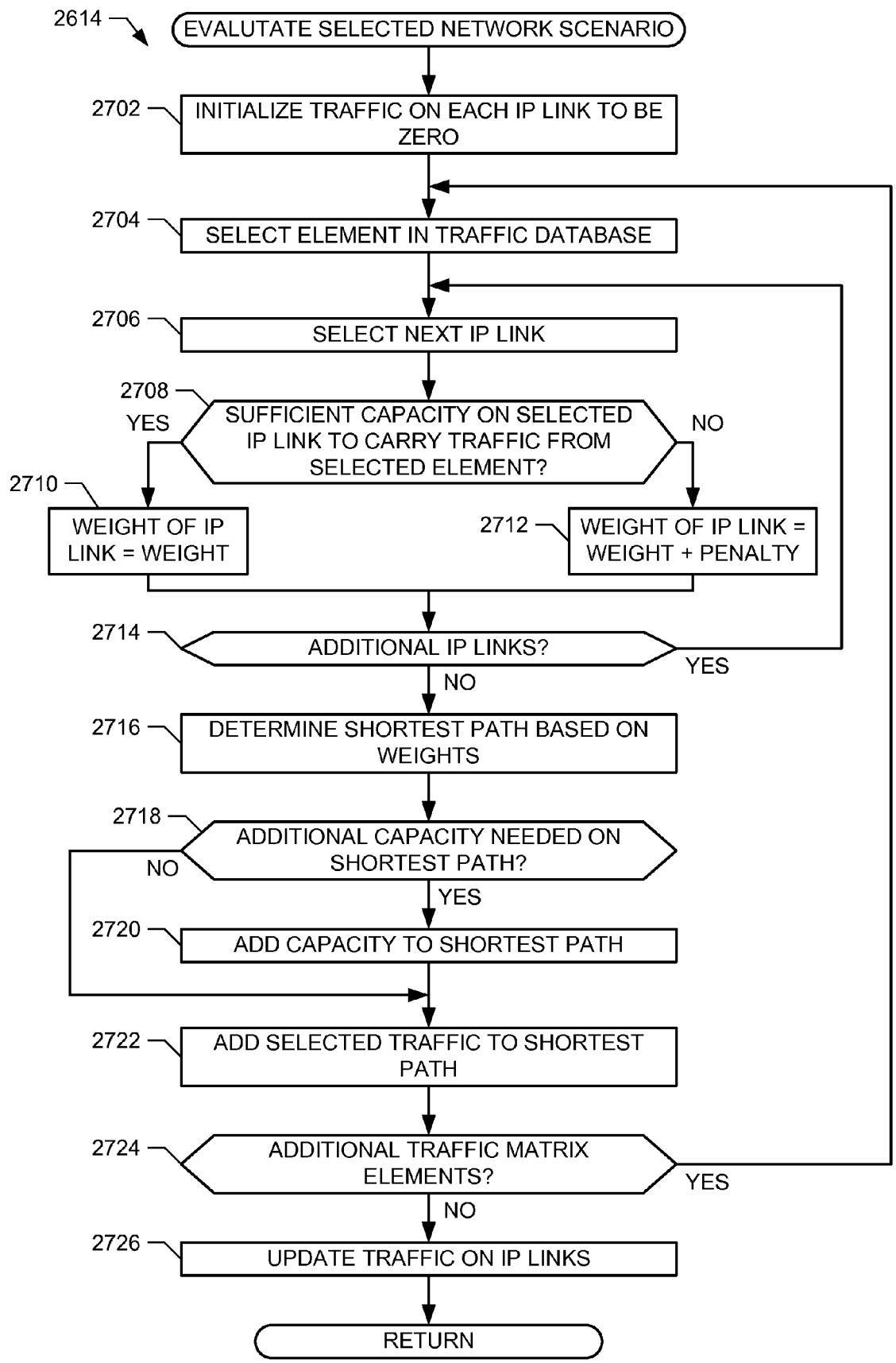
FIG. 27 is a flowchart depicting an example process, which may be implemented using, for example, machine readable instructions that may be executed to determine IP link capacities required for a selected network scenario.

FIG. 27 is a flowchart depicting an example process, which may be implemented using, for example, machine readable instructions 2614 that may be executed to determine IP link capacities $c_i$ required for a selected network scenario. The example instructions 2614 may be executed by the network scenario tester 1506 of FIG. 16 to implement block 2614 of FIG. 26. The example network scenario tester 1506 (e.g., via the scenario initializer 1604) initializes a traffic variable $t_i$ to be zero for each IP link i (block 2702).

The element selector 1606 of FIG. 16 selects a traffic element from the traffic database 304 of FIG. 3 (block 2704). In some examples, the element selector 1606 selects the traffic element from an ordered list of the traffic elements in the traffic database 304. The IP link evaluator 1608 then selects an IP link i from the IP link topology (block 2706). The IP link topology may include, for example, the IP links from the initial IP links database 306 and the first m potential express links in the chosen express links database 310 of FIG. 3. The IP link evaluator 1608 determines whether the selected IP link i has a sufficient capacity $c_i$ to carry the traffic from the selected traffic element in addition to the traffic $t_i$ currently assigned to the IP link i (block 2708). The IP link evaluator 1608 may further include a requirement that adding the traffic from the traffic element to the IP link i complies with any utilization constraints (e.g., $t_i < 0.95 * c_i$).

If the IP link i has sufficient capacity $c_i$ (block 2708), the IP weighter 1610 of FIG. 16 does not change the weight $w_i$ associated with the IP link i (block 2710). In contrast, if the IP link i does not have sufficient capacity $c_i$ (block 2708), the IP weighter 1610 applies a penalty to the weight $w_i$ of the IP link i (block 2712). The penalty may be additive or multiplicative. After the IP weighter determines a weight $w_i$ for the IP link i (block 2710 or block 2712), the IP link evaluator 1608 determines whether there are any additional IP links i to be considered with the selected traffic element (block 2714). If there are additional IP links i to be considered (block 2714), control returns to block 2706 to select the next IP link i.

If there are no additional IP links i to be considered with respect to the selected traffic element (block 2714), the path calculator 1612 determines the shortest path based on the weights $w_i$ of the IP links i (block 2716). The path calculator 1612 further determines whether any one or more of the IP links i along the shortest path needs additional capacity to support the traffic from the selected traffic element (block 2718). If any of the IP links i needs additional capacity (block 2716), the path calculator 1612 increases the tentative capacity(ies) ci of the IP links i that need the additional capacity (block 2720).

If no additional capacity is needed along the shortest path (block 2718) or after adding needed capacity (block 2720), the traffic adder 1614 adds the traffic on the selected traffic element to the IP links i on the shortest path (block 2722). The element selector 1606 then determines whether there are additional traffic elements to be selected from the traffic database 304 (or the ordered list of traffic elements) (block 2724). If there are additional traffic elements (block 2724), control returns to block 2704 to select the next traffic element from the traffic database 304 (or the ordered list of traffic elements). If there are no more traffic elements (block 2724), the traffic updater 1616 updates the traffic on the IP links i (block 2726). For example, the traffic updater 1616 may determine whether the traffic $t_i$ is greater than the upper traffic $T_i$ for any of the IP links i and adjust the upper traffic $T_i$ for the IP links i for those IP links i.

In a computational example, the network designer 102 designs a network including 100 nodes, of which 54 nodes are backbone nodes, and 138 physical links. The total IP traffic in the example network is 15 terabits per second (Tbps). Additionally, only 40 Gbps optical wavelengths are used. FIG. 28 is a table 2800 illustrating a computational comparison of four different IP link topologies 2802, 2804, 2806, and 2808. The table 2800 illustrates the capacity that would be needed for each of the IP link topologies 2802-2808 to provide single-failure restoration in units of 1000 Wavelength-km, the number of 40 Gbps wavelengths (e.g., IP ports at the nodes), and the cost of each of the IP link topologies 2802-28508 normalized to 100. The cost model for the table 2800 assumes that the IP cost for one 40 Gbps IP link is equivalent to 385 wavelength-km of transport cost. As illustrated in FIG. 28, the best solution of the example topologies 2802-2808 is the Case 3 topology 2806, which uses 68 express links.

An additional advantage of the example network designer 102 is that many designs may have a cost near the "optimal" cost, which allows for a large number of choices in network design without adding significant cost to the chosen network design over the optimal cost. Thus, if a particular IP link topology near the optimal cost has a latent feature that is not represented in the cost model, a user of the network designer may implement the topology without suffering substantial additional costs.

FIG. 29 is a table 2900 illustrating an example computational comparison of four different failure restoration scenarios 2902, 2904, 2906, and 2908. The example scenario 2904 corresponds to the example IP link topology 2806 of FIG. 28. The example scenarios 2906 and 2908 assume that a subset of traffic is considered high-priority and must be restored even in the event of double and triple failure scenarios. The table 2900 includes the capacity, IP links, and total cost computations calculated in the example of FIG. 28, and further includes a spare capacity ratio, which is the percentage increase of total capacity-mileage required by a protection scheme (e.g., single, double, triple failure restoration) compared to a service-only scheme (e.g., no failure restoration), where a lower spare capacity ratio is generally better. A network design generated by the example network designer 102 and based on the example IP link topology 2806 of FIG. 28 and improved to include single and double failure restoration and single, double, and triple failure restoration include less than 30% additional capacity.

FIG. 30 is a table 3000 illustrating an example computational comparison of two different failure routing methods 3002 and 3004. The failure routing method 3002 corresponds to the case 3 design 2806 of FIG. 28, which utilizes optimized MPLS/TE. The second failure routing method 3004 illustrates the results with OSPF routing. Both failure routing methods use single-failure. The second failure routing method 3004 includes weights assigned to links that are proportional to route-km in order to minimize latency. As illustrated in FIG. 30, the optimized MPLS/TE scheme achieves significant savings in spare capacity ratio (and cost). The spare capacity ratio of the optimized MPLS/TE method 3002 is about 66% lower and the cost is about 26% lower compared to OSPF method 3004.

FIG. 31 is a table 3100 illustrating an example computational comparison of two different capacity planning methods 3102 and 3104. The traffic database is assumed to be 30% more than the actual traffic observed on an example network in April 2009. The example uses 50 IP backbone nodes and 84 IP links. Between each pair of backbone nodes there are two MPLS/TE tunnels, one carrying regular traffic and the other carrying "priority" traffic. The design is also latency-constrained, with an allowed upper limit for $D_2 - D_1$ of 25 ms and an allowed upper limit for $D_2/D_1$ of 3. The table 3100 illustrates the capacity requirements for MPLS/TE routing 3102 using the above-described techniques and OSPF shortest path routing 3104 using PMO or present mode of operation. As illustrated in FIG. 31, the above-described methods result in substantial savings. It is also interesting to note that there is more savings on the inter-office links (i.e., links between nodes in different cities) compared to intra-office links (i.e., links between nodes in the same city) because inter-office links are significantly more expensive than intra-office links.

The difference in expense between inter-office and intra-office links was achieved by using a steeper penalty function for inter-office links.

Figure 32:
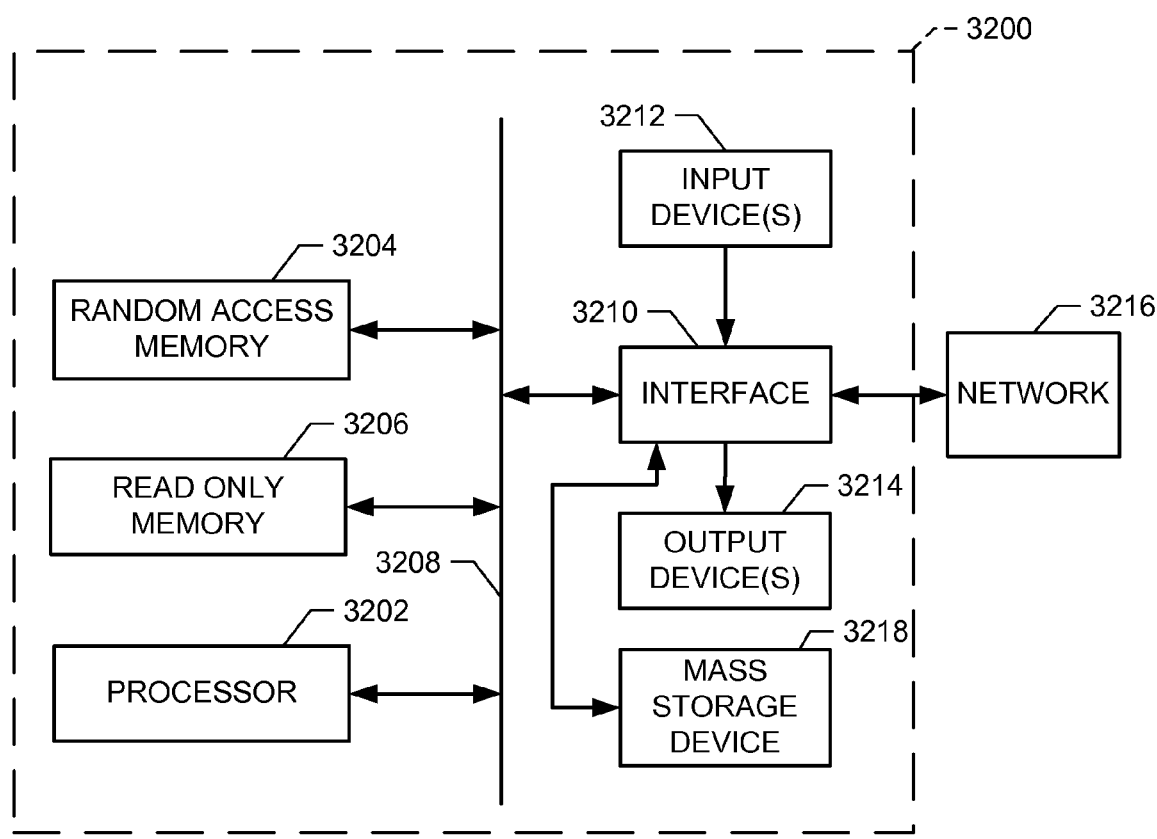
FIG. 32 is a block diagram of an example processing system that may execute machine readable instructions to carry out the example processes of FIGS. 21, 22, 23, 24, 25, 26, and/or 27 to implement some or all of the example systems and/or apparatus of FIGS. 1, 3, 15, and/or 16.

FIG. 32 is a block diagram of an example processing system 3200 that may execute example machine readable instructions to carry out the processes of FIGS. 21, 22, 23, 24, 25, 26, and 27 to implement some or all of the example topology database 302, the example traffic database 304, the example initial IP links database 306, the example potential express links database 308, the example chosen express links database 310, the example IP link identifier 312, the example express link identifier 314, the example traffic evaluator 316, the example express link evaluator 318, and/or the example topology evaluator 320, the example topology generator 1502, the example topology initializer 1504, the example network scenario tester 1506, the example convergence tester 1508, the example cost calculator 1510, and/or the example topology selector 1512, the example scenario selector 1602, the example scenario initializer 1604, the example element selector 1606, the example IP link evaluator 1608, the example IP link weighter 1610, the example path calculator 1612, the example traffic adder 1614, and/or the example traffic updater 1616, and/or, more generally, the example network designer 102 of FIGS. 1, 3, 15, and 16. The processing system 3200 can be, for example, a server, a personal computer, a personal digital assistant (PDA), an Internet appliance, a DVD player, a CD player, a digital video recorder, a personal video recorder, a set top box, a VoIP telephone, an analog telephony adapter, or any other type of computing device.

A processor 3202 is in communication with a main memory including a volatile memory 3204 and a non-volatile memory 3206 via a bus 3208. The volatile memory 3204 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3206 may be implemented by flash memory and/or any other desired type of memory device. Access to the main memory 3204, 3206 is controlled by a memory controller (not shown).

The processing system 3200 also includes an interface circuit 3210. The interface circuit 3210 may be implemented by any type of interface standard, such as an Ethernet interface, a universal serial bus (USB), and/or a third generation input/output (3GIO) interface.

One or more input devices 3212 are connected to the interface circuit 3210. The input device(s) 3212 permit a user to enter data and commands into the processor 3202. The input device(s) can be implemented by, for example, a keyboard, a mouse, a touchscreen, a track-pad, a trackball, isopoint and/or a voice recognition system.

One or more output devices 3214 are also connected to the interface circuit 3210. The output devices 3214 can be implemented, for example, by display devices, such as a liquid crystal display, a cathode ray tube display (CRT), a printer and/or speakers. The interface circuit 3210, thus, typically includes a graphics driver card.

The interface circuit 3210 also includes a communication device such as a modem or network interface card to facilitate exchange of data with external computers via a network 3216, such as an Ethernet connection, a digital subscriber line (DSL), a telephone line, coaxial cable, a cellular telephone system or any other network interface. The network 3216 may be implemented via the communications network 100 of FIG. 1.

The processing system 3200 also includes one or more mass storage devices 3218 for storing software and data. Examples of such mass storage devices 3218 include floppy disk drives, hard drive disks, compact disk drives and digital versatile disk (DVD) drives.

As an alternative to implementing the methods and/or apparatus described herein in a system such as the device of FIG. 32, the methods and/or apparatus described herein may alternatively be embedded in a structure such as processor and/or an ASIC (application specific integrated circuit).

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein may be stored on a tangible storage medium, such as: a magnetic medium, such as a magnetic disk or tape; a magneto-optical or optical medium such as an optical disk; or a solid state medium such as a memory card or other package that houses one or more read-only (non-volatile) memories, random access memories, or other re-writable (volatile) memories, or successor storage media to any of the above.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, these examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to generate a network topology, comprising:
identifying a plurality of potential express links based on a first subset of a plurality of physical links coupling a plurality of communication network nodes, wherein at least one of the potential express links comprises a network layer link traversing more than one of the physical links;
determining an amount of network layer traffic that may be carried on a first potential express link;
selecting the first potential express link as a chosen express link based on at least one of the traffic or a first number of network layer links on the physical links;
adding the chosen express link to a list of express links;

generating, using a microprocessor, a plurality of network topologies by selecting at least one express link from the list of express links; and selecting one of the generated network layer topologies based on a cost of the generated network layer topologies.

2. A method as defined in claim 1, wherein determining the amount of network layer traffic comprises:

selecting a traffic element comprising two of the communication network nodes and a traffic demand;

identifying a path between the traffic element nodes, the path comprising a subset of the communication network nodes;

determining whether the subset of the communication network nodes includes endpoint nodes of the first potential express link; and adding the traffic element to the traffic when the subset of the communication network nodes includes the endpoint nodes.

3. A method as defined in claim 1, wherein selecting the first potential express link comprises determining the first number of the network layer links on the physical links that result from choosing the first potential express link, and choosing the first potential express link when the first number of the network layer links associated with the first potential express link is lower than numbers of network layer links associated with other potential express links.

4. A method as defined in claim 3, further comprising choosing the first potential express link when the first number of the network layer links associated with the first potential express link is equal to a second number of the network layer links associated with at least one second potential express link and lower than the other potential express links and the traffic associated with the first potential express link is higher than traffic associated with the at least one second potential express link.

5. A method as defined in claim 3, wherein the first number of the network layer links comprises a lowest number of the network layer links on any of the physical links.

6. A method as defined in claim 1, wherein the first number of the network layer links comprises a number of network layer links on a shared risk link group, wherein the shared risk link group comprises at least one of the physical links that carry at least one network layer links in common.

7. A method as defined in claim 1, further comprising determining a topology capacity associated with selecting the at least one express link, wherein the cost is based on the topology capacity.

8. A method as defined in claim 7, wherein determining the topology capacity comprises determining a capacity for the network layer links associated with the physical links and the at least one selected express link.

9. A method as defined in claim 1, further comprising receiving a physical link topology and a plurality of traffic elements, wherein the traffic elements correspond to traffic sent between the plurality of communication network nodes via the physical links.

10. A method as defined in claim 1, wherein the chosen express link comprises a network layer link traversing a plurality of physical links.

11. An apparatus, comprising:

a topology database to store a plurality of physical links between a plurality of communication network nodes;

a potential express links database to store a plurality of potential express links based on a subset of the plurality of communication network nodes;

an express link identifier to identify the plurality of potential express links based on the topology database;

a traffic evaluator to determine an amount of network layer traffic on a first potential express link;

an express link evaluator coupled to the traffic evaluator to select the first potential express link as a chosen express link based on at least one of a potential traffic or a number of network layer links on the physical links; and a topology evaluator coupled to the express link evaluator to generate a plurality of network layer topologies by selecting at least one express link from a list of express links, and to select one of the generated topologies based on a cost.

12. An apparatus as defined in claim 11, further comprising a traffic database to store a plurality of traffic elements, wherein the traffic elements correspond to traffic demands between the plurality of communication network nodes via the physical links, wherein the express link identifier is to identify the plurality of potential express links based on the traffic elements.

13. An apparatus as defined in claim 11, wherein the topology evaluator is to generate a first network topology comprising a plurality of network layer links corresponding to the plurality of physical links in the topology database and at least one top express link in the list of chosen express links.

14. An apparatus as defined in claim 11, wherein the traffic evaluator is to determine the potential traffic by:

selecting a traffic element comprising two of the communication network nodes and a traffic demand;

identifying a path between the traffic element nodes, the path comprising a second subset of the communication network nodes;

determining whether the second subset includes endpoint nodes of the first potential express link; and adding the traffic element to the potential traffic when the second subset includes the endpoint nodes.

15. A machine readable storage device comprising machine readable instructions which, when executed, cause a machine to at least:

identify a plurality of potential express links based on a first subset of a plurality of physical links coupling a plurality of communication network nodes;

determine an amount of network layer traffic on a first potential express link;

select the first potential express link as a chosen express link based on at least one of the traffic or a first number of network layer links on the physical links;

add the chosen express link to a list of express links;

generate a plurality of network topologies by selecting at least one express link from the list of express links; and select one of the generated network layer topologies based on a cost of the generated network layer topologies.

16. A storage device as defined in claim 1, wherein determining the potential traffic comprises:

selecting a traffic element comprising two of the communication network nodes and a traffic demand;

identifying a path between the traffic element nodes, the path comprising a subset of the communication network nodes;

determining whether the subset of the communication network nodes includes endpoint nodes of the first potential express link; and adding the traffic element to the traffic when the subset of the communication network nodes includes the endpoint nodes.

17. A storage device as defined in claim 15, wherein selecting the first potential express link comprises determining the first number of the network layer links on the physical links that result from choosing the first potential express link, and choosing the first potential express link when the first number of the network layer links associated with the first potential express link is lower than numbers of network layer links associated with other potential express links.

18. A storage device as defined in claim 15, wherein the instructions further cause the machine to determine a topology capacity associated with selecting the at least one express link, wherein the cost is based on the topology capacity.

19. A storage device as defined in claim 18, wherein determining the topology capacity comprises determining a capacity for the network layer links associated with the physical links and the at least one selected express link.

20. A storage device as defined in claim 15, wherein the instructions further cause the machine to receive a physical link topology and a plurality of traffic elements, wherein the traffic elements correspond to traffic demands sent between the plurality of communication network nodes via the physical links.

* * * * *